Figure 1:
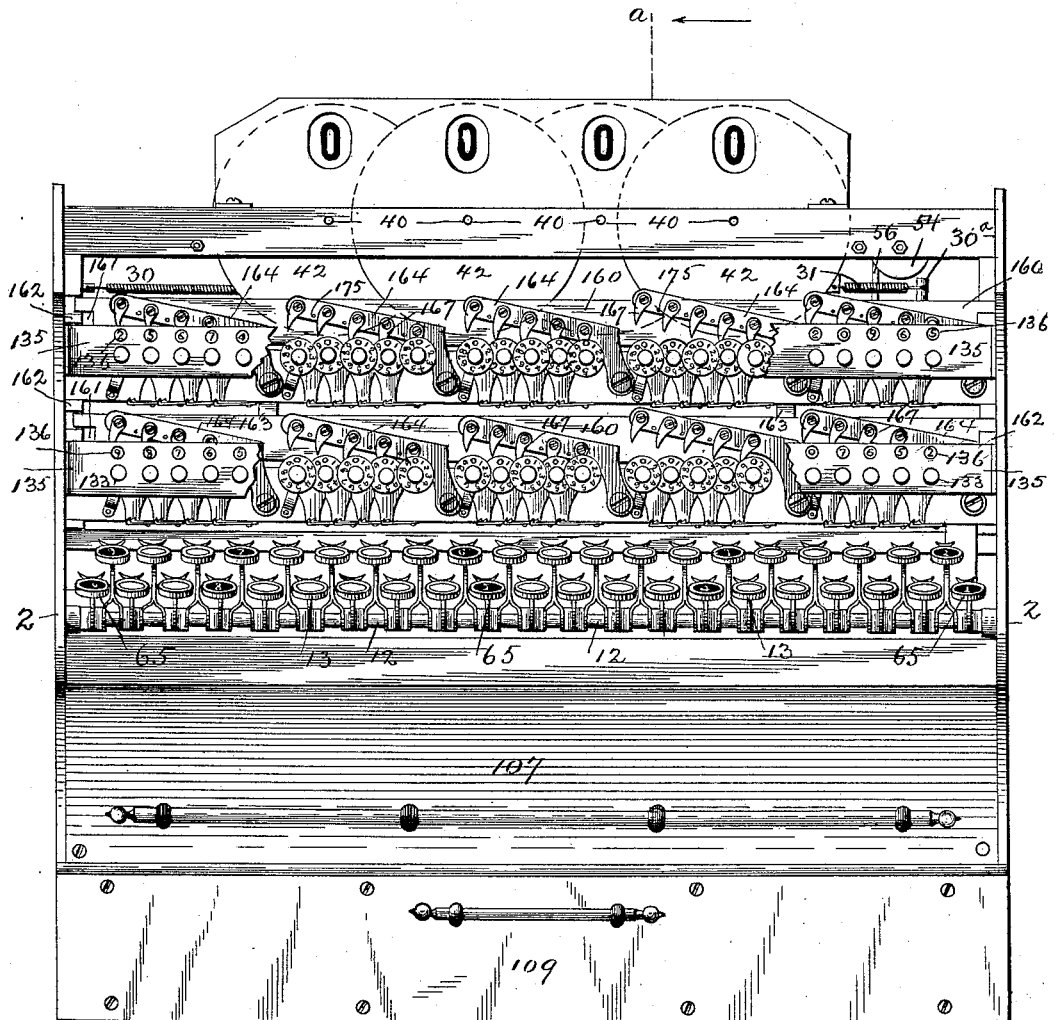

(No Model.) 14 Sheets—Sheet 1.

C. L. LILLEBERG.
CASH REGISTER AND INDICATOR.

No. 525,956. Patented Sept. 11, 1894.

WITNESSES:
Franck L. Ourand.
Jo. L. Coombs

INVENTOR:
Charles Leonard Lilleberg,
by Lewis Bagger & Co.
Attorneys.

(No Model.) 14 Sheets—Sheet 2.

C. L. LILLEBERG.
CASH REGISTER AND INDICATOR.

No. 525,956. Patented Sept. 11, 1894.

WITNESSES:
F. L. Durand
W. L. Coombs

INVENTOR:
Charles Leonard Lilleberg,
by James Sagger &Co.
Attorneys.

(No Model.)  
14 Sheets—Sheet 5.

C. L. LILLEBERG.
CASH REGISTER AND INDICATOR.

No. 525,956.  
Patented Sept. 11, 1894.

WITNESSES:  
F. L. Durand  
W. L. Coombs

INVENTOR:  
Charles Leonard Lilleberg,  
Louis Baggu &Co.  
Attorneys.

(No Model.) 14 Sheets—Sheet 6.
C. L. LILLEBERG.
CASH REGISTER AND INDICATOR.
No. 525,956. Patented Sept. 11, 1894.
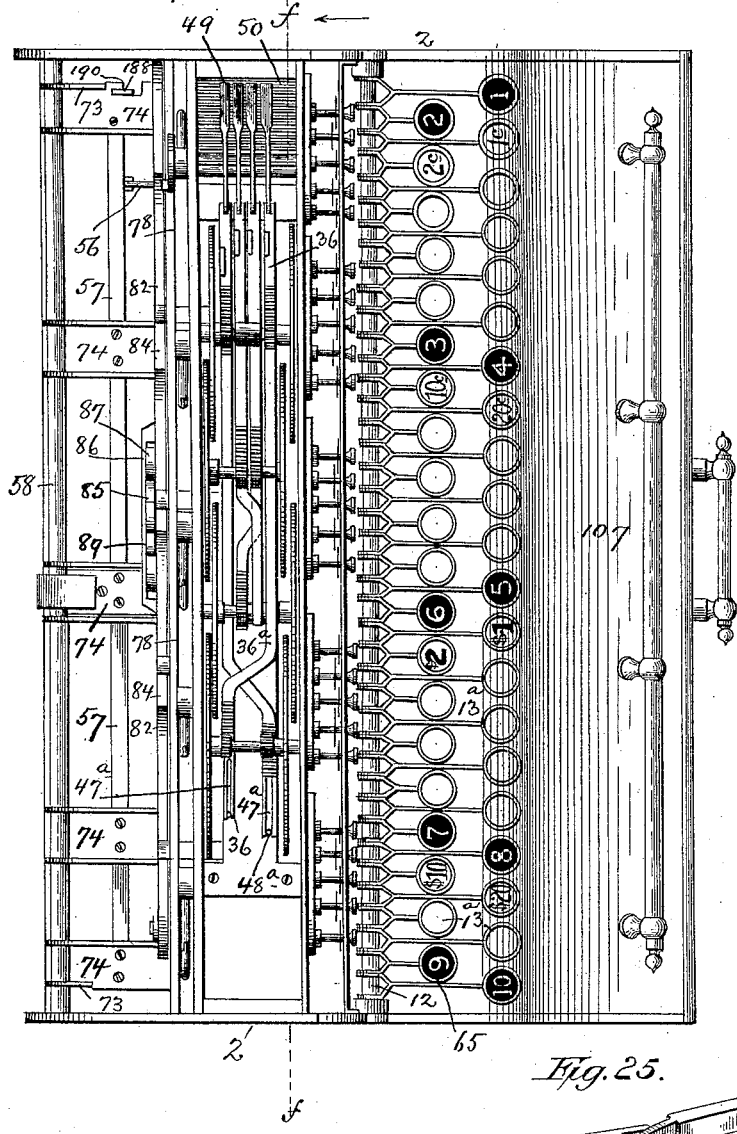
Fig. 6.
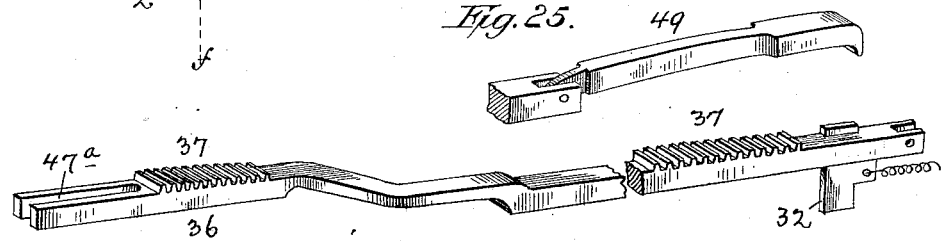
Fig. 25.
Fig. 24.
WITNESSES:
F. L. Ourand
J. D. Coombs
INVENTOR:
Charles Leonard Lilleberg
by James Sagger & Co.
Attorneys

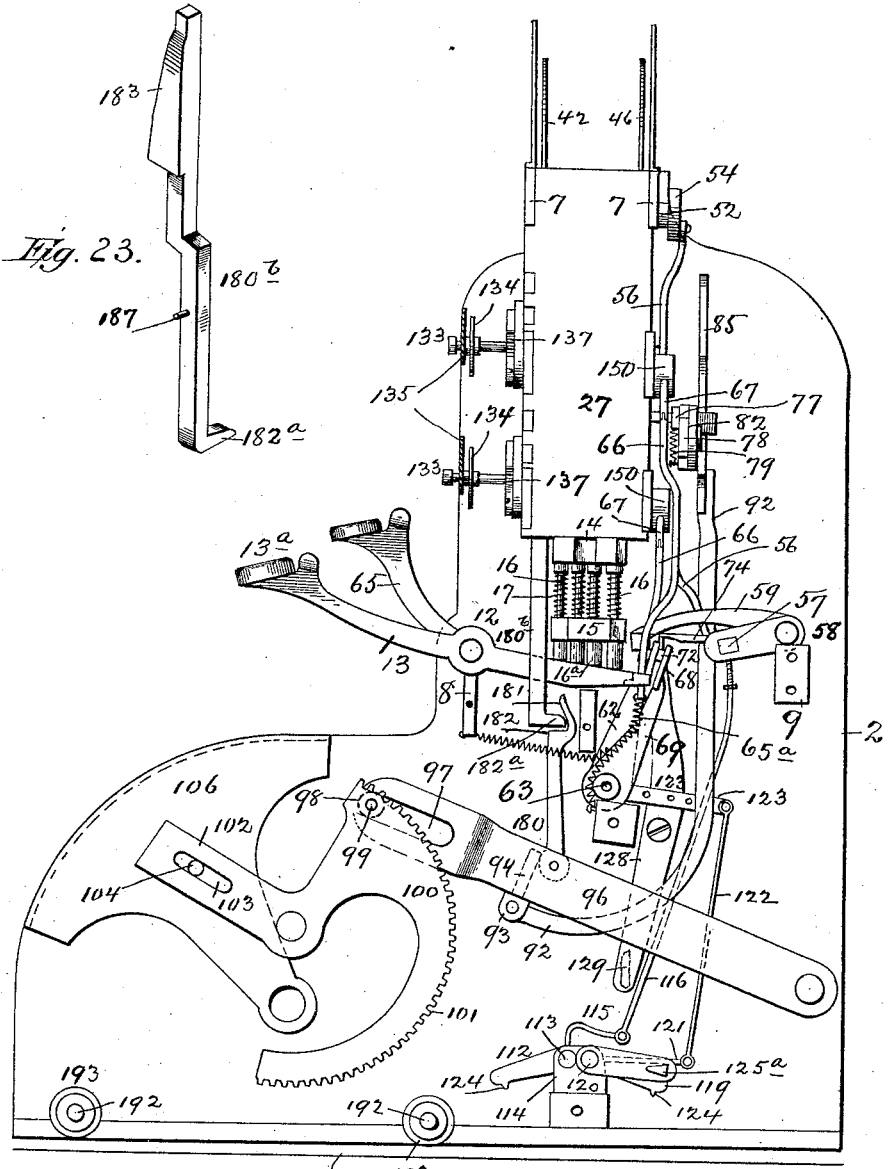

(No Model.) 14 Sheets—Sheet 8.
C. L. LILLEBERG.
CASH REGISTER AND INDICATOR.
No. 525,956. Patented Sept. 11, 1894.
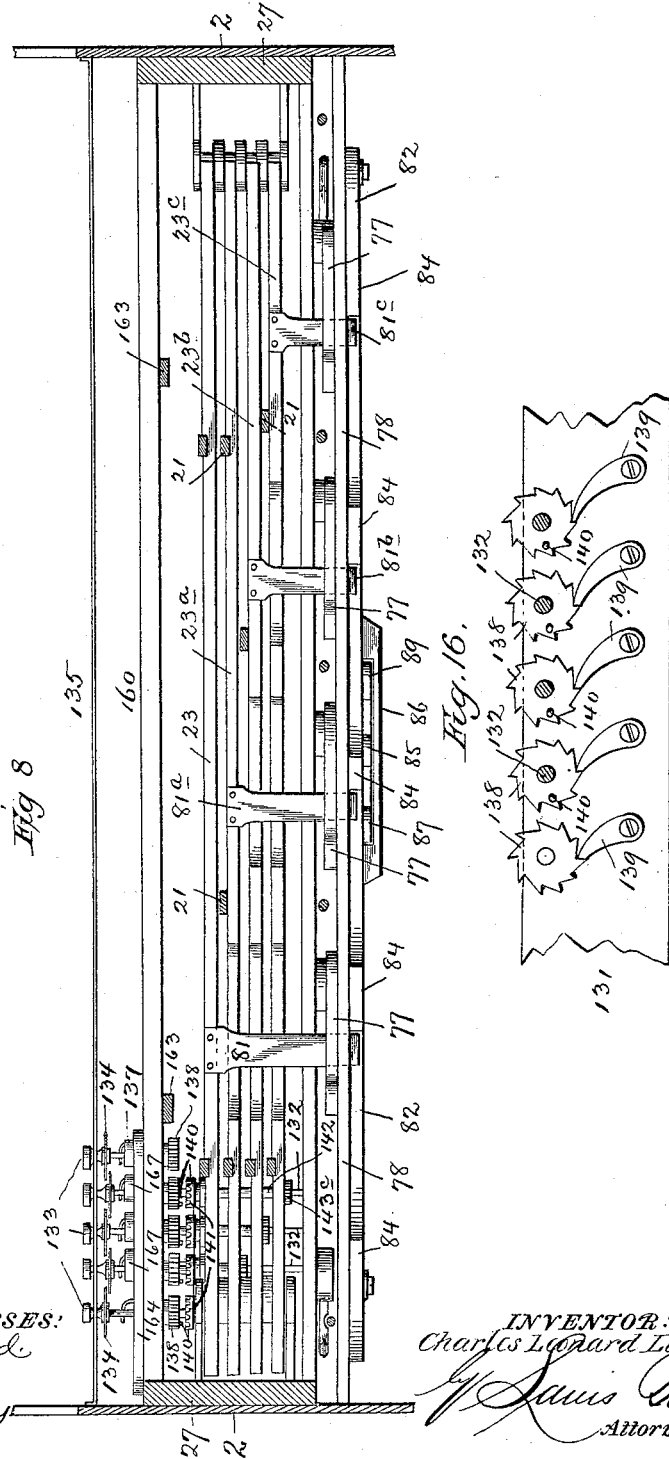
WITNESSES:
INVENTOR:
Charles Leonard Lilleberg,
Attorneys.

(No Model.) 14 Sheets—Sheet 9.
C. L. LILLEBERG.
CASH REGISTER AND INDICATOR.
No. 525,956. Patented Sept. 11, 1894.
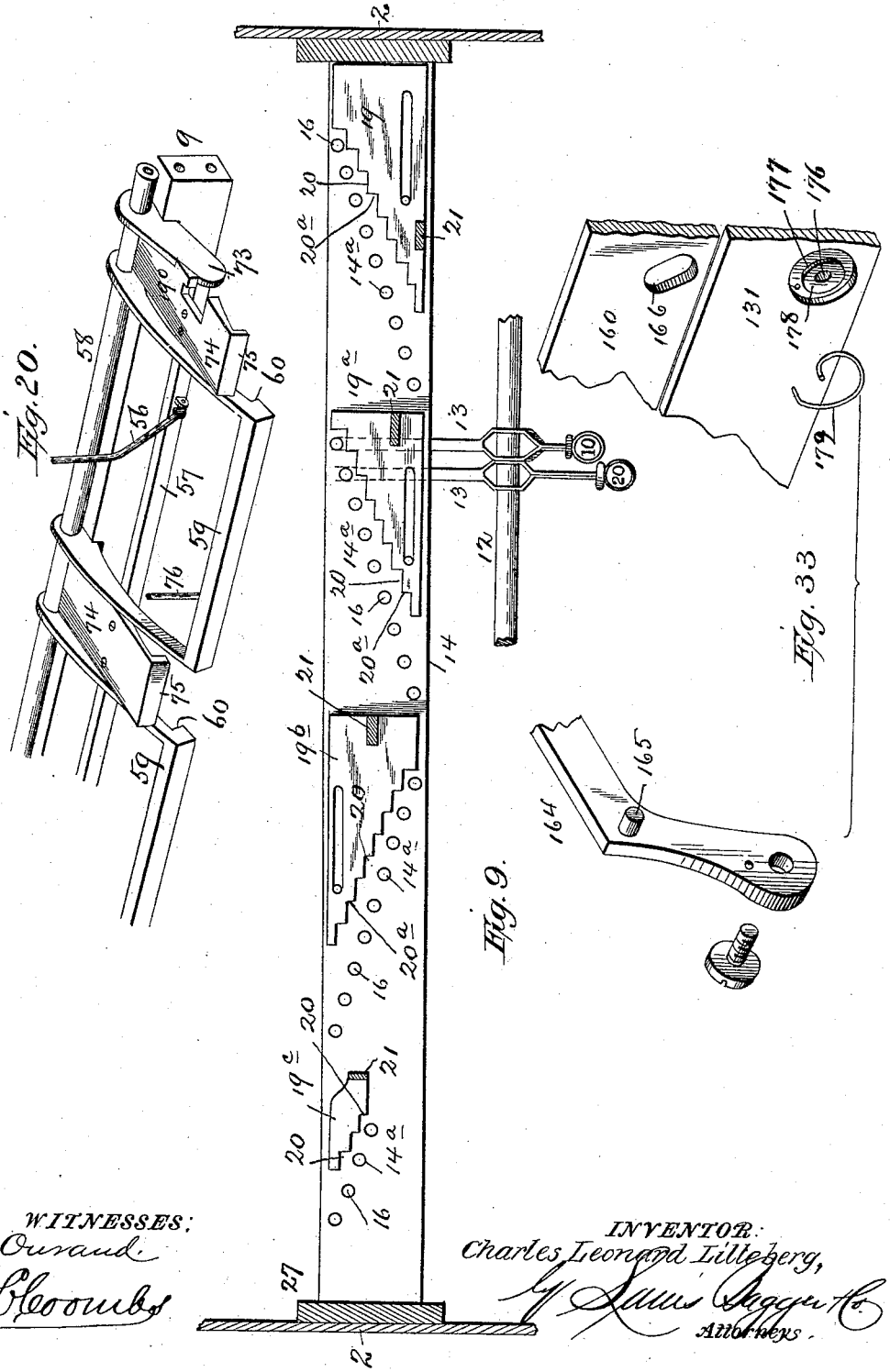
WITNESSES:
F. L. Ourand
Jo. D. Coombs
INVENTOR:
Charles Leonard Lilleberg,
by Lewis Bagger & Co.
Attorneys.

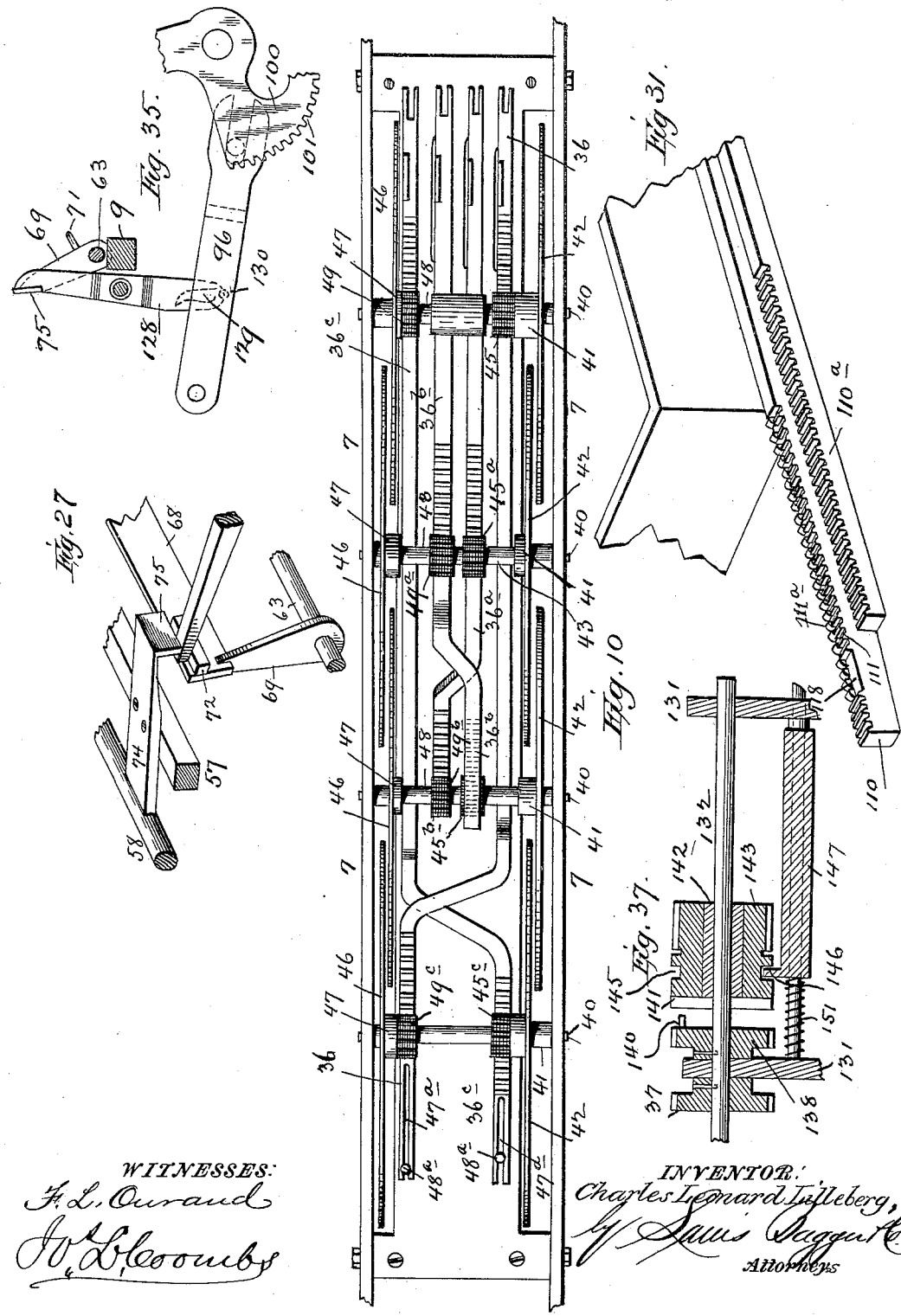

(No Model.) 14 Sheets—Sheet 11.

C. L. LILLEBERG.
CASH REGISTER AND INDICATOR.

No. 525,956. Patented Sept. 11, 1894.

WITNESSES:
F. L. Durand
H. L. Coombs

INVENTOR
Charles Leonard Lilleberg,
V. Lewis Dagger & Co.
Attorneys (No Model.) 14 Sheets—Sheet 12.
C. L. LILLEBERG.
CASH REGISTER AND INDICATOR.
No. 525,956. Patented Sept. 11, 1894.
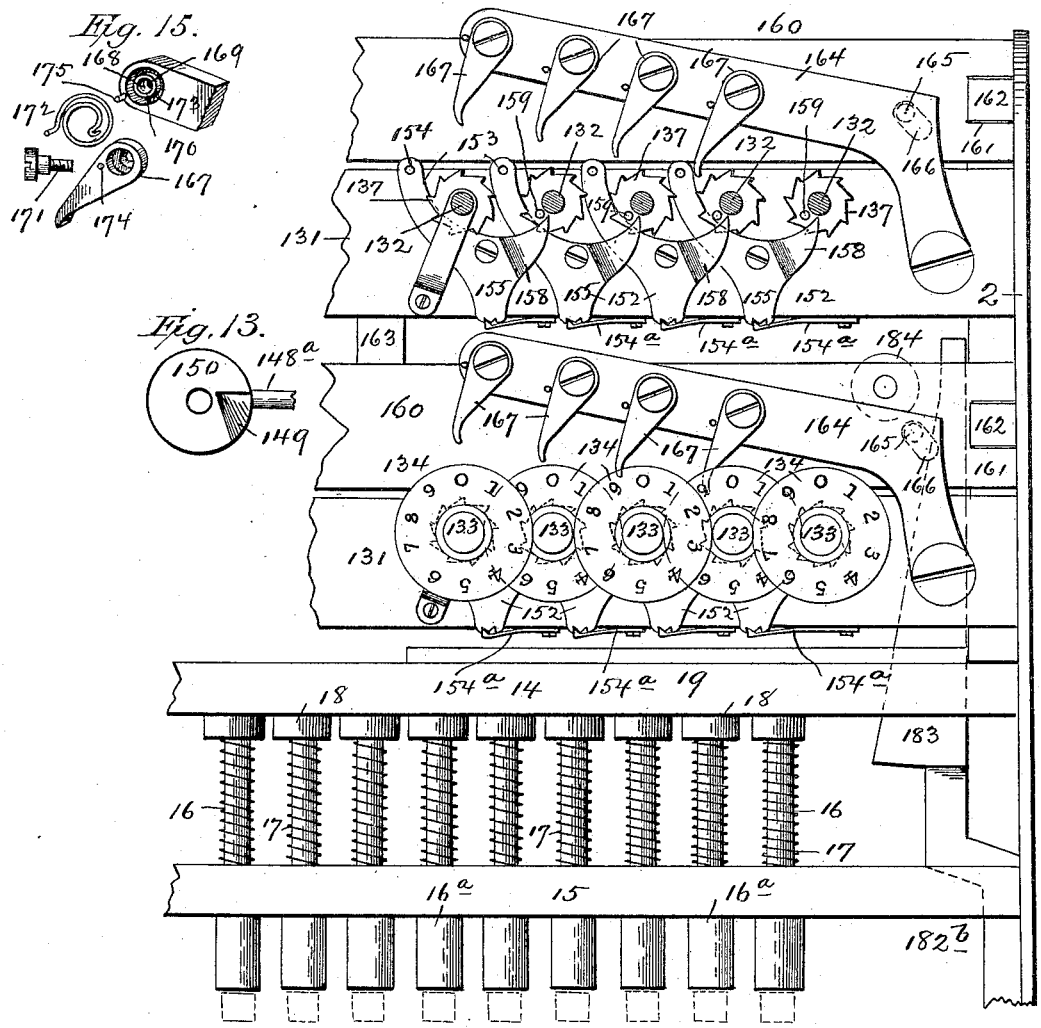

(No Model.) 14 Sheets—Sheet 13.
C. L. LILLEBERG.
CASH REGISTER AND INDICATOR.
No. 525,956. Patented Sept. 11, 1894.
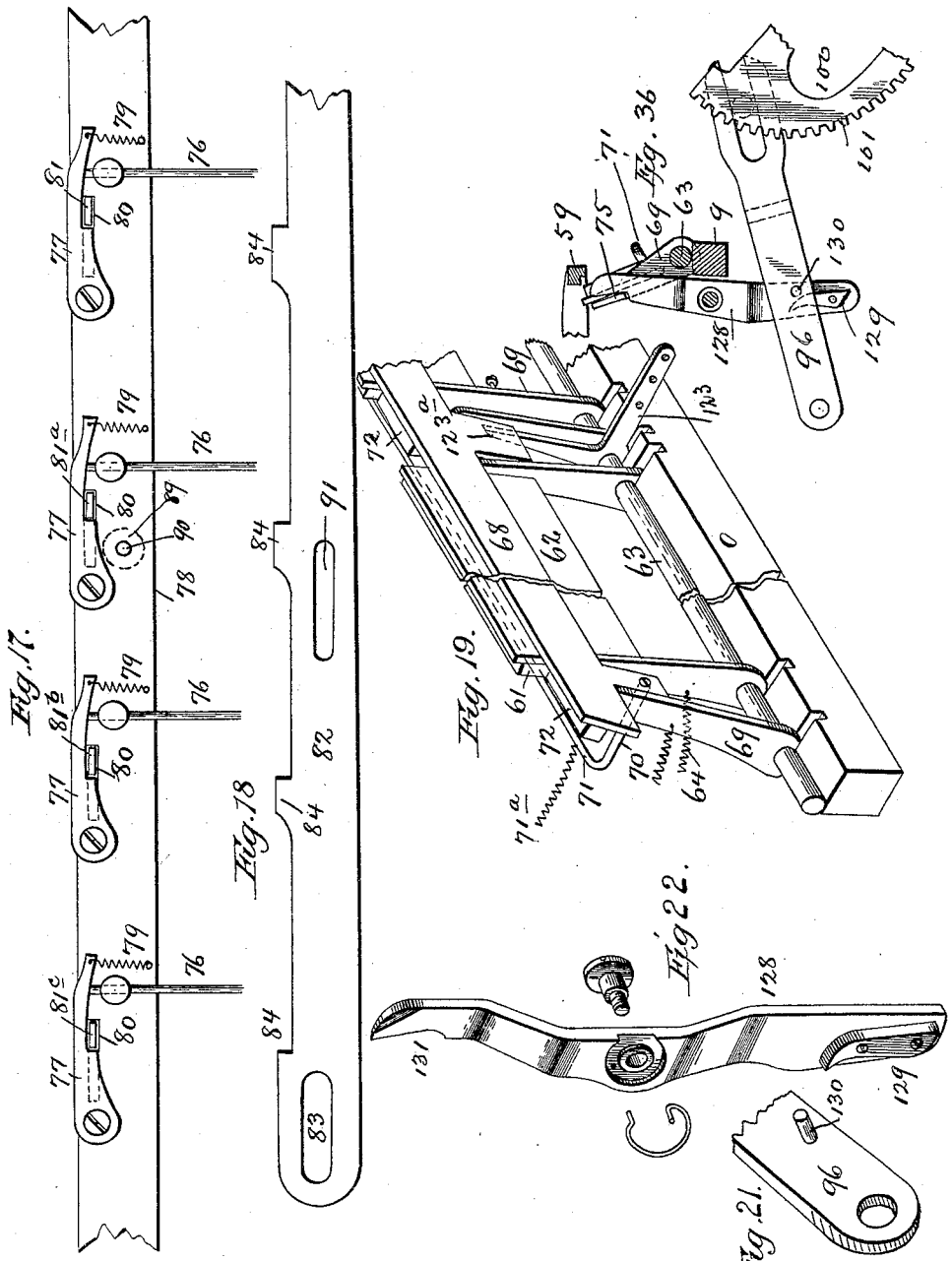
WITNESSES:
F. L. Ourand
Jo. L. Coombs
INVENTOR:
Charles Leonard Lilleberg,
G. Lewis Jagger & Co.
Attorneys.

(No Model.) 14 Sheets—Sheet 14.

C. L. LILLEBERG.
CASH REGISTER AND INDICATOR.

No. 525,956. Patented Sept. 11, 1894.

WITNESSES:
F. L. Durand.
J. D. Coombs

INVENTOR:
Charles Leonard Lilleberg,
by Louis Bagger & Co.
Attorneys.

THE NORRIS PETERS CO., PHOTO-LITHO., WASHINGTON, D. C.

UNITED STATES PATENT OFFICE.

CHARLES LEONARD LILLEBERG, OF STOUGHTON, WISCONSIN, ASSIGNOR OF SIX-SEVENTHS TO OLE BILSTAD, K. G. OLSEN, O. M. TURNER, F. B. HYLAND, A. F. SCHELDRUP, AND L. K. LUSE, OF SAME PLACE.

CASH REGISTER AND INDICATOR.

SPECIFICATION forming part of Letters Patent No. 525,956, dated September 11, 1894.

Application filed October 30, 1893. Serial No. 489,556. (No model.)

*To all whom it may concern:*

Be it known that I, CHARLES LEONARD LILLEBERG, a citizen of the United States, and a resident of Stoughton, in the county of Dane and State of Wisconsin, have invented certain new and useful Improvements in Cash-Registers; and I do hereby declare that the following is a full, clear, and exact description of the invention, which will enable others skilled in the art to which it appertains to make and use the same, reference being had to the accompanying drawings, which form a part of this specification.

My invention relates to improvements in cash registers of that character or description in which a series of indicating keys are employed arranged in series of nine each, by depressing which the mechanism for actuating the display is thrown into operative condition for indicating the value of the key depressed; a series of registering separate and independent keys connected with registering mechanisms which register the amount or amounts so displayed; and a sliding till or cash drawer having a pivoted cover connected therewith by the movement of which the mechanism for operating said display plates and registering mechanisms are operated.

The invention consists in the novel construction and combination of parts hereinafter fully described and claimed.

Figure 2:
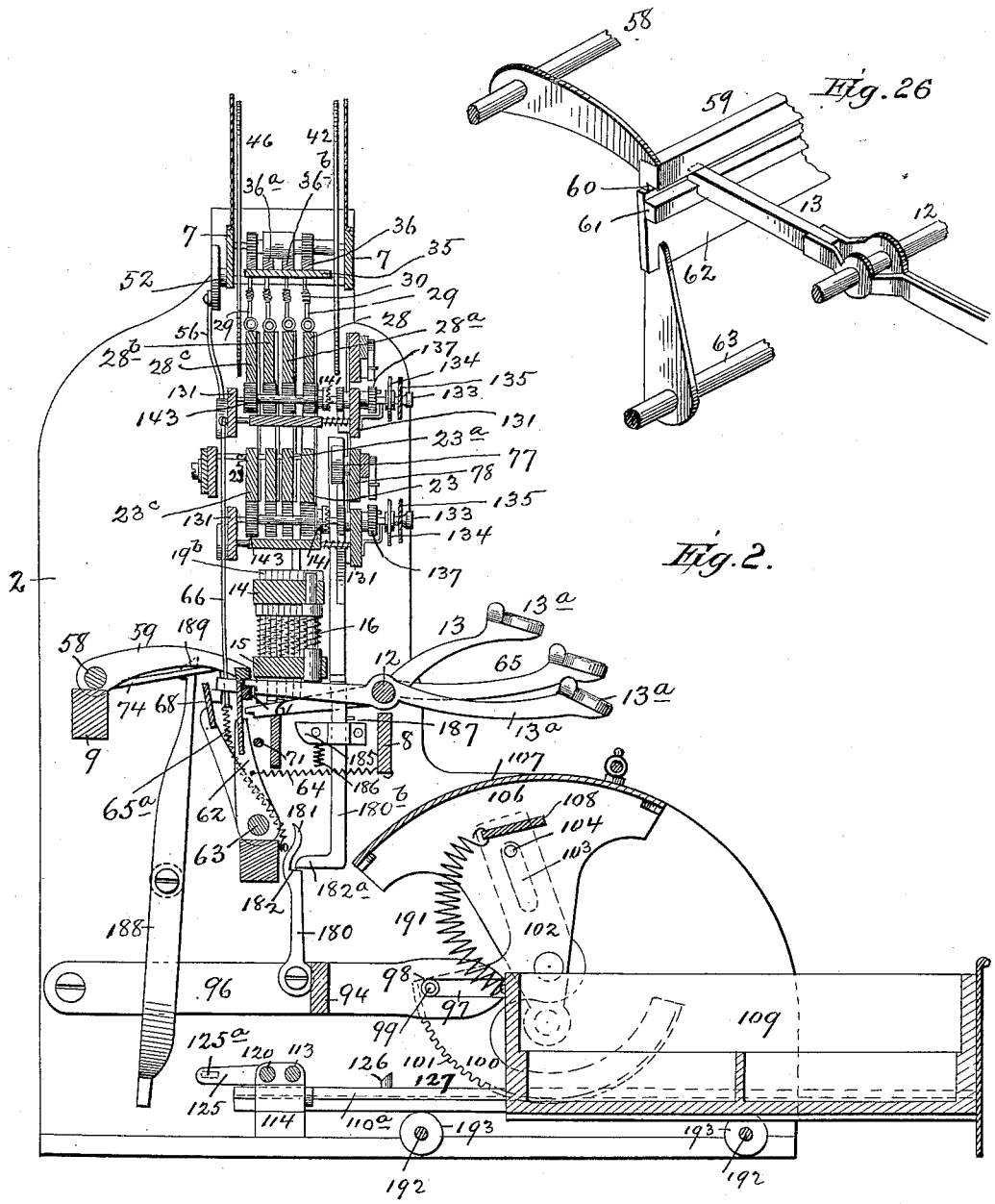
Figure 3:
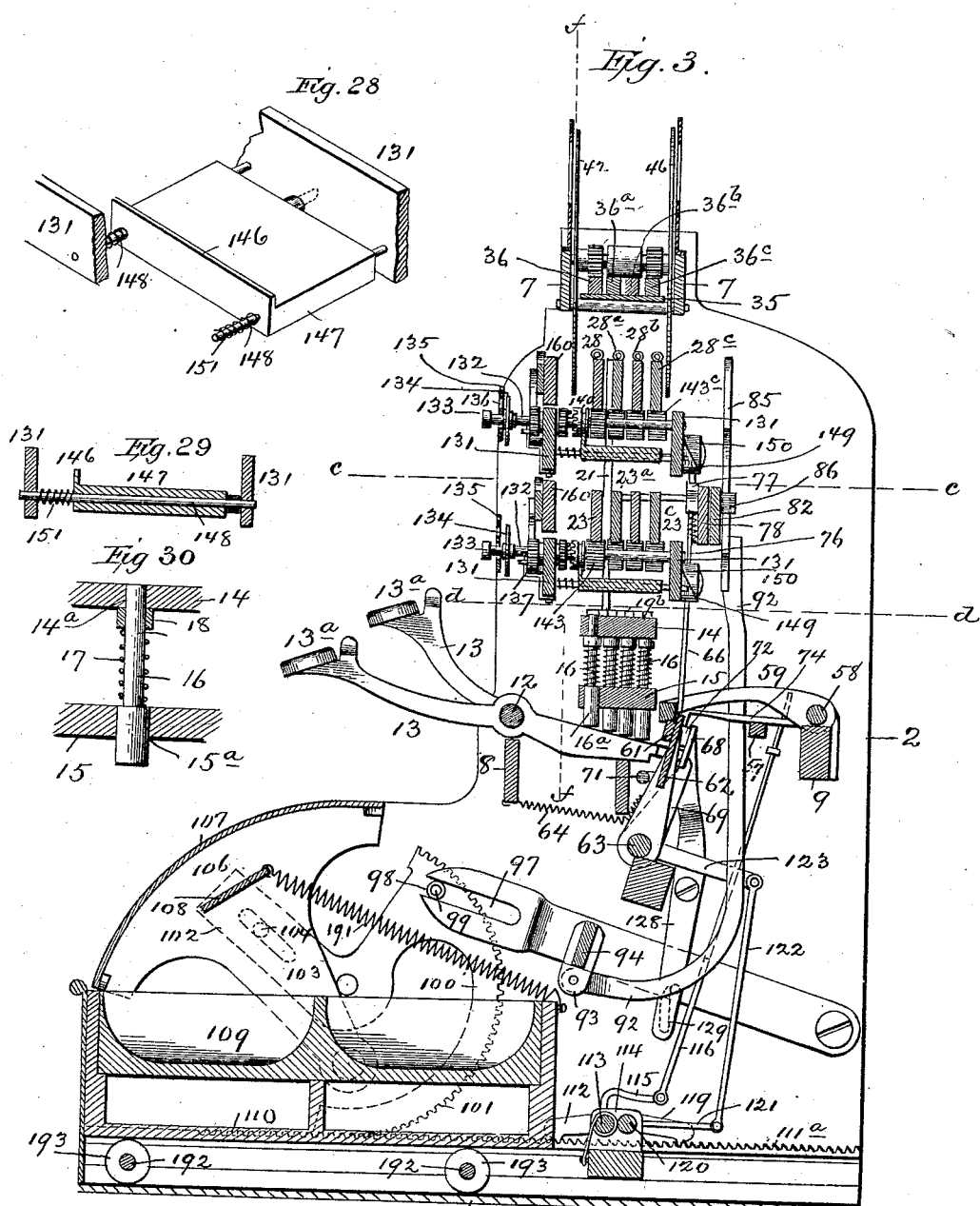
Figure 4:
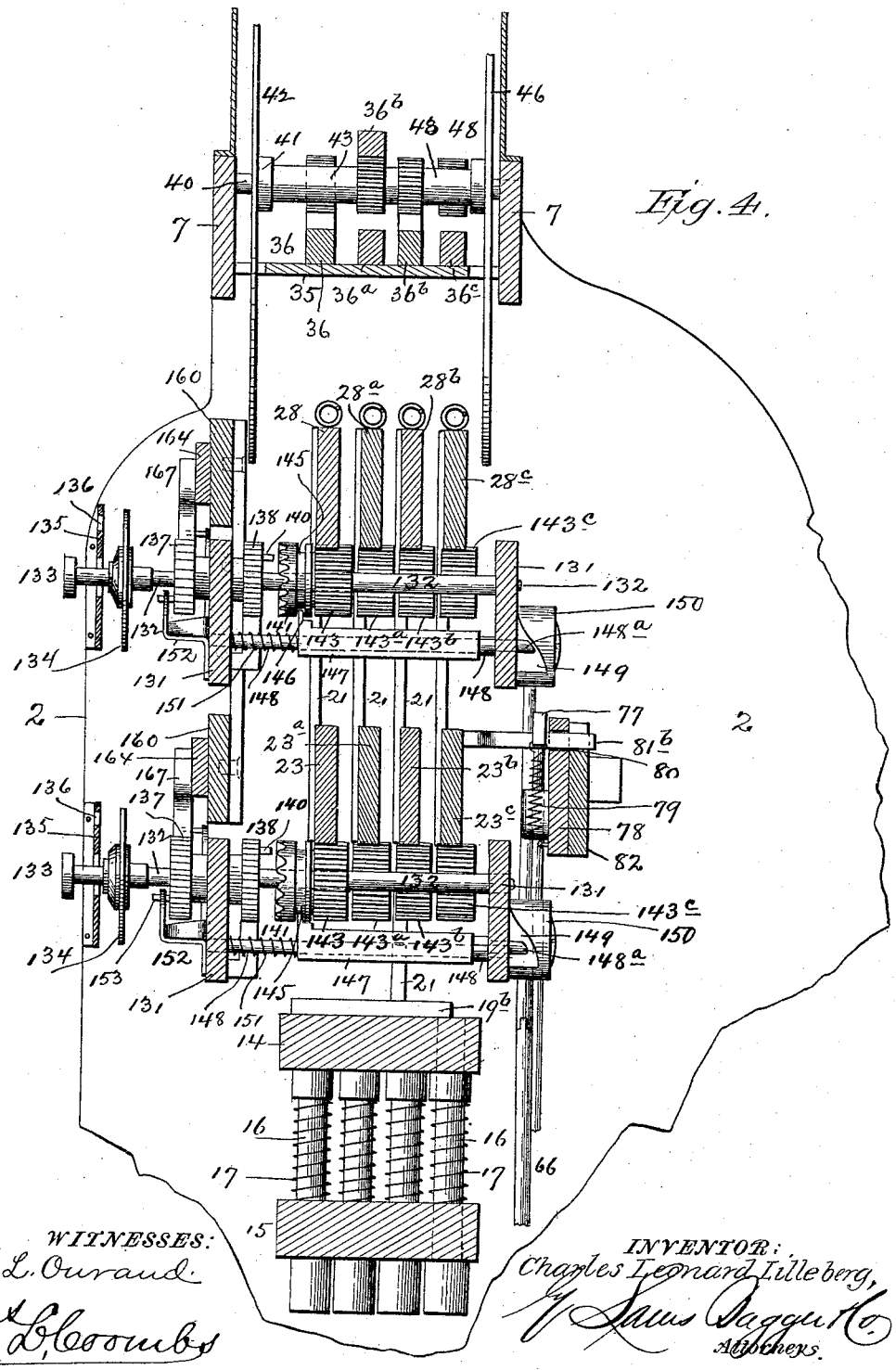
Figure 5:
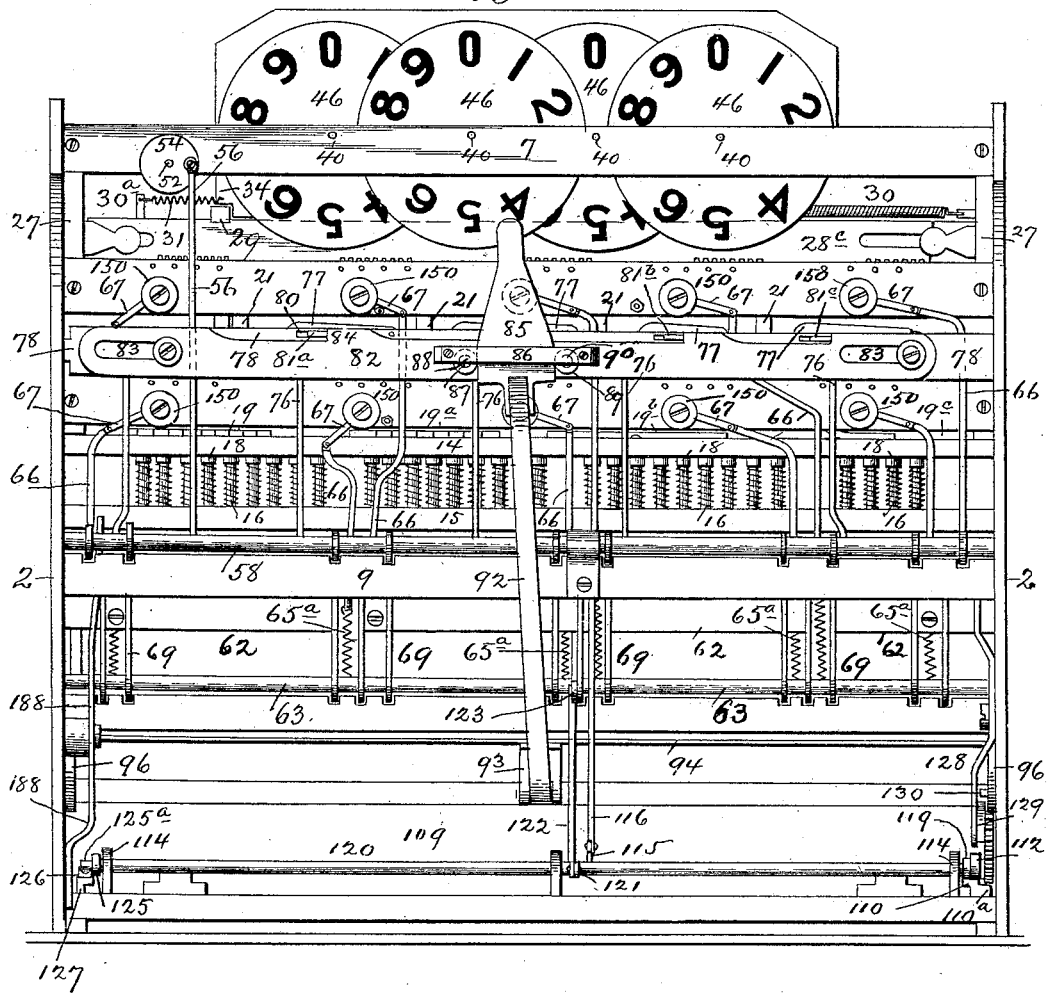
Figure 11:
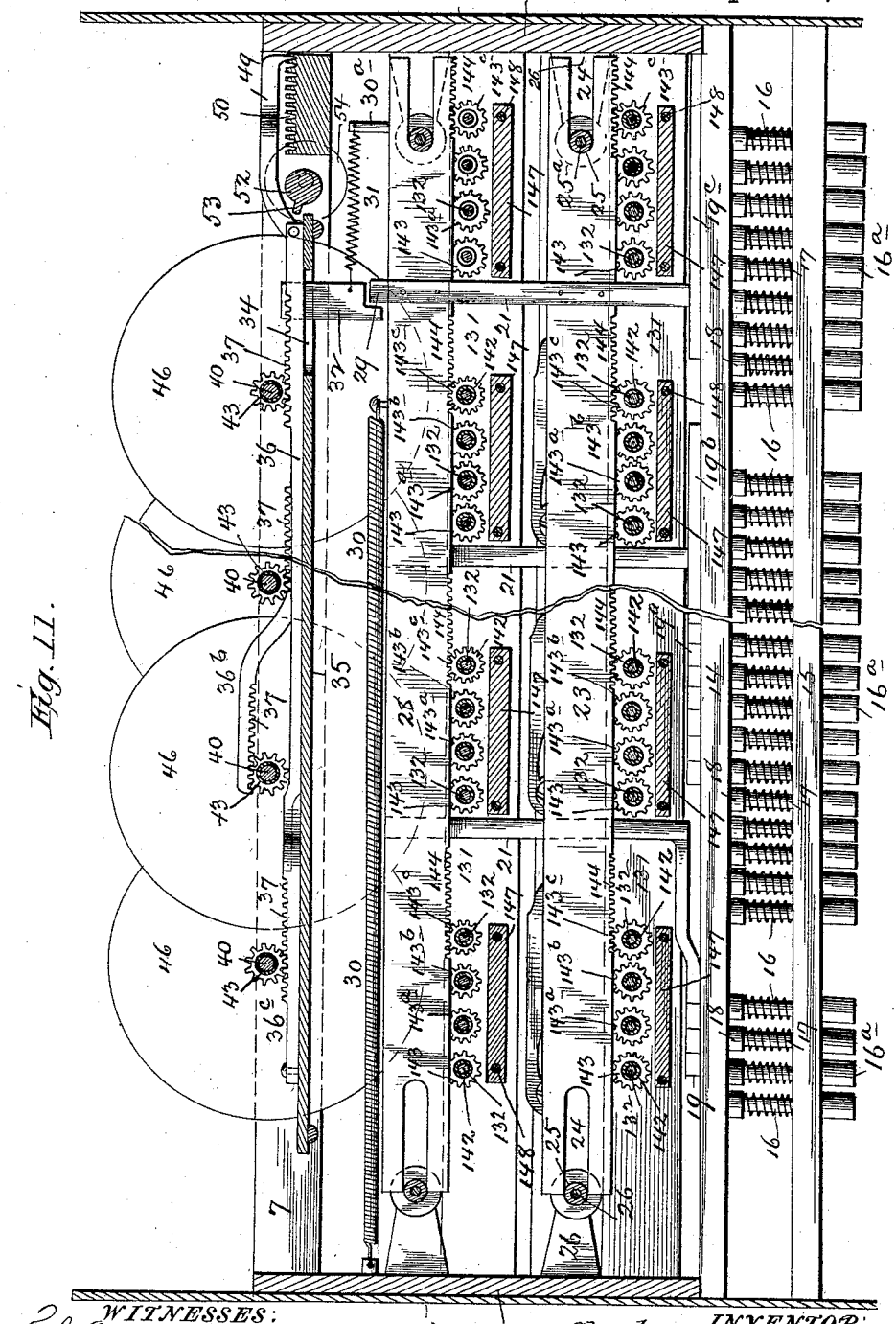
Figure 34:
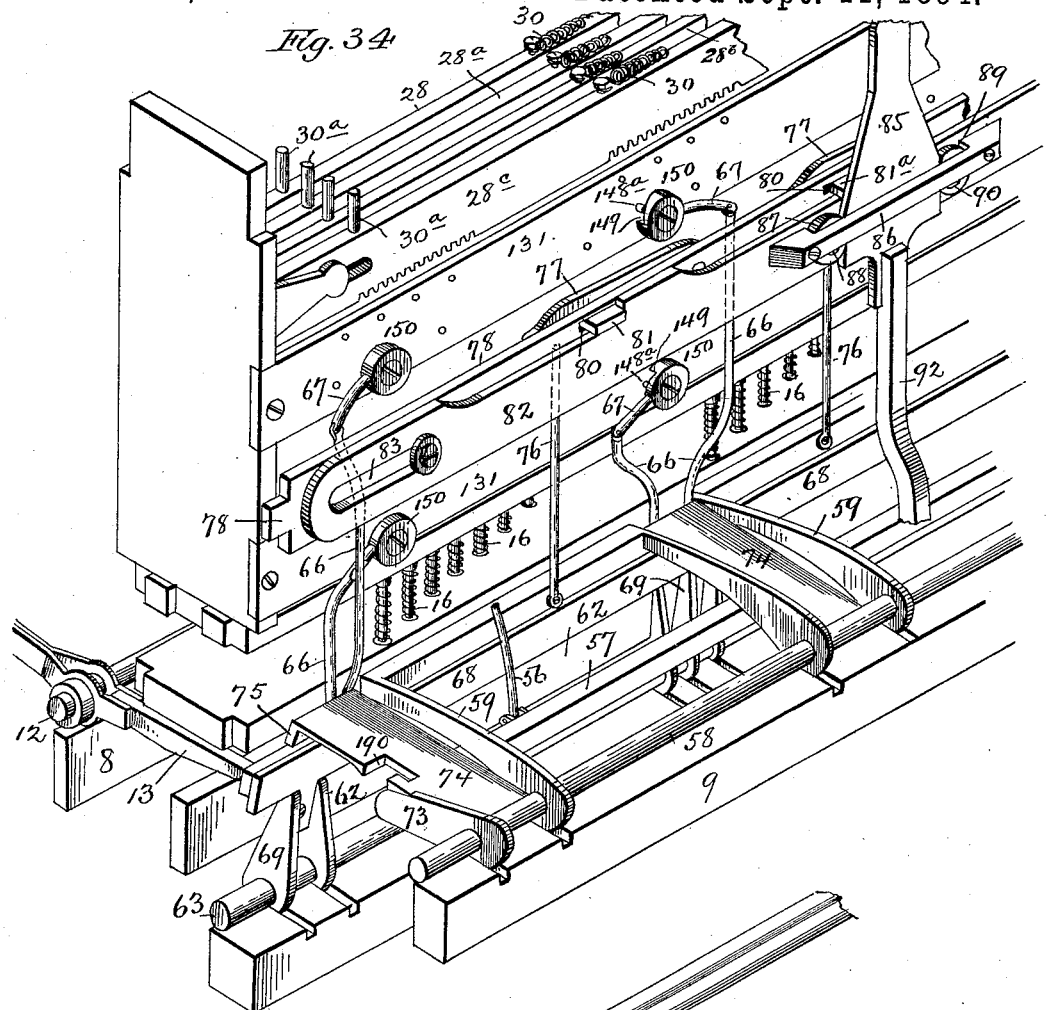
Figure 32:
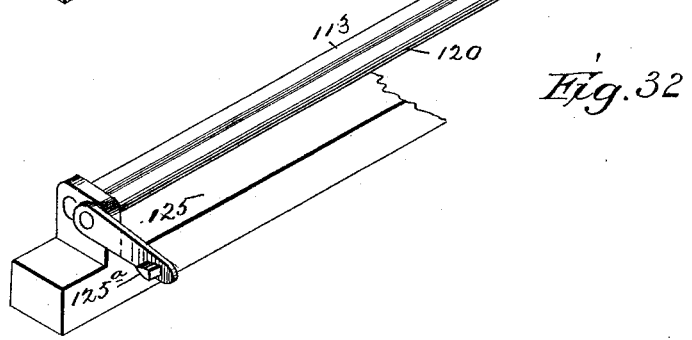

In the accompanying drawings: Figure 1 is a front view of a cash register constructed in accordance with my invention, the front casing being removed and part broken away to show more clearly the construction of the registering mechanisms. Fig. 2 is a central transverse section of the apparatus, looking toward the right of the apparatus, the cash drawer being open. Fig. 3 is a similar view on the line $a\,a$, Fig. 1, looking in the opposite direction, the drawer being closed. Fig. 4 is a detail section on the same plane, on an enlarged scale. Fig. 5 is a rear view the back of the apparatus being removed. Fig. 6 is a plan view the top of the casing being removed. Fig. 7 is an elevation looking from the right of the apparatus, the side thereof being removed. Fig. 8 is a detail horizontal section on the line $c, c$, Figs. 1 and 3. Fig. 9 is a detail transverse section on the line $f, f$ Fig. 3. Fig. 10 is a plan view on an enlarged scale of the rack bars for operating the display plates. Fig. 11 is a detail central longitudinal section of the upper part of the apparatus. Fig. 12 is a detail front elevation, showing the registering mechanism and the pins operated by the indicating keys on an enlarged scale. Fig. 13 is a view of one of the disks for throwing the registering mechanisms into operative condition. Fig. 14 is a perspective view of one of the trip levers for turning the registering dials. Fig. 15 is a detail view of one of the pawls for actuating the trip levers showing the construction and arrangement of the spring. Fig. 16 is a detail view showing the pawls and ratchets for preventing backward movement of the registering dials. Fig. 17 is a detail view showing the dogs for locking the plates which actuate the display disks and registering mechanisms. Fig. 18 is a detail view of the reciprocating plate at the rear of the machine for holding the plates which actuate the display disks and registering mechanisms. Fig. 19 is a detail perspective view of the bails at the rear of the machine for locking the indicating keys. Fig. 20 is a similar view of the devices for locking the registering keys. Fig. 21 is a detail view of one end of one of the rearwardly extending arms actuated by the movement of the cash drawer. Fig. 22 is a similar view of the pivoted lever actuated by said arm. Fig. 23 is a detail perspective view of the bar which operates the plates carrying the levers and pawls which operate the registering dials. Fig. 24 is a detail perspective view of one of the rack bars which actuate the display plates. Fig. 25 is a similar view of one of the hooks pivoted to said rack bars. Fig. 26 is a detail perspective view showing one of the indicating keys and the bails acting in conjunction therewith. Fig. 27 is a similar view of the rear end of one of the registering keys and its bail. Fig. 28 is a detail perspective view of one of the sliding plates for throwing the registering mechanism into operative condition. Fig. 29 is a sectional view of the same taken near one end. Fig. 30 is a detail section showing one of the pins elevated by the depression of the indicating key. Fig. 31 is a detail perspective view of one end of the cash drawer showing the rack bars connected therewith. Fig. 32 is a detail view showing the transverse bar and crank and stud for locking the cash drawer. Fig. 33 shows in perspective the reciprocating plates and pawls for actuating the registering transfer devices. Fig. 34 is a detail perspective view of the rear of the apparatus the back being removed. Figs. 35 and 36 are detail views showing the manner of actuating the bails by closing the cash drawer so as to unlock the keys. Fig. 37 is a detail sectional view of the means for throwing the registering mechanism into operative condition.

In the said drawings the reference numeral 1 designates the bottom of the apparatus, and 2 the sides of the casing. This casing comprises a back, top, front and pivoted door, which may be opened to inspect the registering mechanism. These parts may be of any ordinary construction, and are therefore not illustrated in the drawings. The sides 2 are rigidly connected together by top cross bars 7, 7, front bar 8, rear bar 9 and bottom bar 10.

Pivoted to a rod 12 secured to the sides 2, are what I term the indicating keys 13, see Figs. 1 and 3, arranged in series of nine each, and in two banks or rows one above the other. The front ends of these keys are provided with disks $13^a$ bearing designating numerals corresponding with the value represented by the key. Thus the nine keys at the right of the machine, which are used to indicate units or cents, are numbered consecutively from "1" to "9." The numerals on the keys of the next series which indicate decimals of a dollar or dimes are arranged in successive increments of ten running from "10" to "90." The next series which indicate the dollars are numbered similar to the first series with a dollar mark ("$") prefixed, and so on as long as desired or found convenient. In the present instance but four keys are illustrated for indicating tens of dollars, as such will be found sufficient for all ordinary purposes. It is obvious, however, that the above arrangement of keys may be varied without departure from my invention, such for instance as placing the units or cents keys at the left of the apparatus and the dollar keys at the right, if so desired. But as it is usual to place the keys of the least value at the right, such arrangement is preferred. Pivoted to said rod 12, and located at convenient points preferably at the beginning of each said series of keys, are arranged what I term the registering keys, which correspond in number with the registering mechanisms, each key being separate and distinct from the others and serving to throw into operative engagement the registering mechanism with which it is connected. The disks bearing the designating characters of these keys are preferably of a contrasting color to the indicating keys so as to be easily distinguished therefrom. These keys and their connections will be hereinafter described in detail.

Secured to the sides 2 at or near the center thereof, see Figs. 2, 3, 5, 7, 9, 10, and 12, are two parallel transverse metal plates 14 and 15, arranged one above the other, and formed with a series of aligned apertures $14^a$ and $15^a$, corresponding in number with the number of indicating keys and arranged in a series of diagonal or slanting lines, one line for each series of said keys. See Fig. 9. Passing through the aligned apertures are vertically movable rods 16, the lower ends of which rest upon the rear ends of the indicating keys. See Figs. 2, 3, and 7. These rods are formed with a head $16^a$ at their lower ends which passes through the apertures in plate 14. See Fig. 30. Encircling the central portion of each of these rods is a coiled spring 17, the lower end of which rests upon head $16^a$ while the upper end is seated against a collar 18, secured to the under side of plate 14, and surrounding the aperture $15^a$. This construction is shown in detail in Fig. 30.

Located upon the upper side of plate 14 is a series of transversely movable plates 19, $19^a$, $19^b$, and $19^c$, one for each series of indicating keys, see Figs. 2, 3, 5, 9, 10 and 12, and each of which has one edge beveled and formed with a series of step by step notches 20, see Fig. 9, one notch for each registering key of the series to which the plate belongs, and as there are nine keys in each series (except the series on the extreme left of the apparatus), there is consequently a corresponding series of notches on each plate. The shoulder $20^a$ of each step or notch is aligned with one of the rods 16, that is to say, the shoulder of the first notch at the right of the plate 19 is aligned with the rod which rests on the first or one cent key, the next step with the rod of the two cent key, and so on throughout the series. The plates $19^a$, $19^b$, and $19^c$ with which the rods of the dimes, dollars, and tens of dollars keys engage respectively are correspondingly constructed and arranged. These rods and plates serve to limit the movement of the parts which actuate the display plates and registering mechanism as will be hereinafter set forth. It will be noted that the distance between each pin of a series is greater than that between the steps of said plates, so that when the second pin from the right is elevated the plate will travel twice the distance before coming in contact therewith than when the first pin is elevated, and so on until the ninth pin is reached when said plate will travel nine times as far as when the first pin is elevated. Each of these plates 19, $19^a$, $19^b$, and $19^c$, is connected by means of a bar or plate 21, with a transversely movable bar 23, $23^a$, $23^b$, $23^c$, arranged side by side and parallel with each other, and provided at each end with a slot 24, see Fig. 11, which engages a roller 25 on a stud $25^a$ secured to lugs 26, which in turn are secured to a vertical plate 27, fixed to the sides 2.

These rods 25 in connection with the slots 24, serve to support and guide the bars. These bars are connected by means of plates or bars 21 with a series of similar bars 28, $28^a$, $28^b$, $28^c$, located above. See Figs. 2, 3, 4, 8, and 10. These bars 28, $28^a$, $28^b$, and $28^c$ by their movement serve to rotate the registering disks hereinafter described and also to throw into operative engagement the parts which actuate the display plates. The said bars 28, $28^a$, $28^b$, and $28^c$ being connected with bars 23, $23^a$, $23^b$, and $23^c$, move in unison therewith, but the latter only actuate the registering mechanisms, and may be dispensed with entirely when a less number of said registering mechanisms are employed, as will be hereinafter described.

The bars 28, $28^a$, $28^b$, and $28^c$, which are movable independently of each other as hereinafter set forth, near the right end are formed or provided with upwardly projecting lugs 29. See Figs. 2, 5, and 11. They are also connected with coiled springs 30, secured to the left or opposite side of the apparatus, the tendency of which springs is to draw the bar toward such side. These bars are also provided with studs $30^a$ which are connected with coiled springs 31, the opposite ends of which are connected with lugs 32, which project downwardly through slots 34, in a plate 35, secured to the upper bars 7, 7. These lugs 32, are connected with rack bars 36, $36^a$, $36^b$, and $36^c$ respectively corresponding with the bars 28, $28^a$, $28^b$, and $28^c$, and are supported by and are transversely movable on the plate 35, see Fig. 4, and each is provided with a series of rack teeth 37. The opposite or free ends of the outer bars 36 and $36^a$ are extended beyond the inner bars and are bent so as to overlap each other and are also provided with rack-teeth 37, so that said teeth on bar 36 will register or lie in the same plane with the teeth on bar $36^c$ and vice versa, the rack teeth on bar $36^c$ are aligned with the teeth on bar 36. The inner bars $36^a$ and $36^b$ similarly overlap each other and are also provided with two series of rack teeth 37. See Fig. 10.

Secured to the plates 7, 7, are four shafts 40, on which are journaled hubs 41, to which are secured rotatable display plates or disks 42, having on their outer faces near the periphery numerals or characters running consecutively from "0" to "9" as is usual in this class of machines. Secured to each hub 41 and rotatable upon the shafts 40, is a sleeve 43, provided with a pinion, which pinions are marked respectively 45, $45^a$, $45^b$, and $45^c$. The pinions connected with the first and second display disks engage with the rack teeth at the right of bars 36 and $36^a$ respectively, while the pinions $45^b$ and $45^c$ mesh with the teeth on the bent overlapping ends of bars $36^b$ and $36^c$. From this it will be seen that if either of the said bars is moved as hereinafter described, one of said display plates will be correspondingly rotated as hereinafter described, according to which bar is actuated, the bar 36 rotating the first disk to the right which indicates cents; the bar $36^a$ actuating the next disk which indicates dimes and so on.

At the opposite or rear ends the shafts 40 are provided with display disks 46, hubs 47, sleeves 48, and pinions 49, $49^a$ $49^b$ and $49^c$, corresponding in all essential features with the disks, hubs, sleeves, and pinions before described. The pinions 49 and $49^a$ engage with the teeth on the free or bent ends of bars 36 and $36^a$ while pinions $49^b$ and $49^c$ engage the teeth toward the right end of bars $36^b$ and $36^c$. It will thus be seen that the front and rear end display disks, diagonally opposite each other are coupled together by the bars 36 and $36^c$, while the intermediate diagonally opposite disks are coupled together by the bars $36^a$ and $36^b$, so that when either of the said front end disks is rotated the rear disk at the opposite end is correspondingly rotated, and similarly when one of the front intermediate disks is actuated the rear intermediate disk diagonally opposite is also rotated. The object of this construction and arrangement is to allow the display disks to be viewed from either the front or rear of the apparatus and to occupy the same relative positions. That is to say, no matter which side the disks are viewed from, the cents disks will always be at the right of the person inspecting the same, the tens of dollars disks at the extreme left, and the intermediate disks at corresponding intermediate points. This arrangement obviates defects inherent to the ordinary single display plates or disks, which have the numbers or characters on both sides thereof, as in the latter construction, the cents disk or plate when viewed from the front will be at the right of the person inspecting the same, while when viewed from the rear it will be at the left, and so with the other disks. At their left or free ends the said bars 36, and $36^c$ are formed with slots $47^a$, with which engage headed pins $48^a$, secured to the plate 35, which in connection with the lugs 32, serve to guide said bars in their movements. See Figs. 6 and 10. The opposite ends of these bars are provided with pivoted hooks 49, Figs. 6, 11, and 25, the free ends of which are adapted to engage with horizontal grooves 50, in a plate 51, these grooves corresponding to the number of indicating keys in a series, and serve as stops for limiting the movement of the said bars as hereinafter explained. Located underneath these hooks, see Figs. 2, 5, 7, and 11, intermediate their ends, is a shaft 52, provided with a rib 53, by which said hooks are raised out of engagement with said grooves. This shaft is actuated to raise and lower said rib and to raise and lower the hooks, by means of a disk 54, a connecting rod 56 and a cross bar 57.

Located at the rear of the apparatus, see Figs. 2, 3, 4, and 34, just above the rear cross bar 9, is a transverse rod 58, upon which is journaled the rearwardly extending arms of a series of horizontal bails 59, one for each series of indicating keys. The lower edge of the transverse portions of each of these bails is formed with a groove 60, with which is adapted to engage a plate 61, upon the transverse portion of a vertical bail 62, the side arms of which are journaled on a rod 63, secured to the sides 2 of the apparatus. The object of these bails 62, is to lock the indicating keys when depressed and hold them in such position until the cash drawer or till has been opened and closed. These bails also lock all the keys of the series to which said depressed key belongs so that no other key in such series can be depressed until after the amount corresponding to said depressed key has been registered as will hereinafter appear. The bail 62 of each series of keys is entirely separate from the bails of the other series, so that although no other key in a series can be depressed after the first depression, any of the keys in any other series can be depressed. For instance supposing the twenty cent key of the dime series is depressed, the rear end of said key will raise bail 59 in rear thereof allowing bail 62, to be pulled forward by means of spring 64, (one of which springs is connected with each bail) when the plate 61, on bail 59 will engage under said key and hold it in place. At the same time said plate will engage over the rear ends of all the keys in the series and thus prevent them from being depressed. The groove 60 will also engage with the bail 62 for a purpose hereinafter explained.

The numeral 65 designates the registering keys, which are pivoted on the rod 12, there being one of these keys for each registering mechanism, and as there are ten registering mechanisms shown in the present instance, there are consequently ten of such keys, each connected with one of said mechanisms and each key bearing at its front end a number or character designating the registering mechanism with which it is connected. These keys are provided with springs 65ª and are arranged in two banks as seen in Fig. 1, and are numbered consecutively from 1 to 10, the key marked "1" being connected with the top registering mechanism at the right of the machine, that marked "2" being connected with the mechanism immediately below, and so on. It is obvious, however, that the arrangement and location of the registering keys and mechanisms may be changed, and also that their number may be varied, if desired. To the rear end of each of these registering keys is connected a jointed or two-part connecting rod, said parts being numbered respectively 66 and 67 Figs. 2, 3, 4, 5, and 7 by which the registering mechanism is thrown into operative condition, as will be hereinafter described.

Just in rear of the bails 62, is a bail for locking the registering keys when depressed, said bail consisting of a bar 68, extending transversely across the apparatus, and provided with downwardly extending arms 69 which are pivoted on the rod 63. See Figs. 2, 3, and 7. The arm 69, at each end or side of the apparatus is provided with a forwardly extending bar 70, to which is secured a rod 71, extending transversely across the apparatus and lying under the rear ends of the indicating and registering keys as seen in Fig. 19. This rod (as well as the intermediate arm 69) is provided with coiled springs 71ª, the tendency of which is to pull the bar 68 forward when a registering key is depressed, and its object is to return the bails 62 to normal position as will be hereinafter explained.

To the upper ends of the arms 69 are secured blocks 72, which engage with and lock the registering keys when depressed. The object of the bar 68 is to connect all the arms 69 together so that they will all move in unison.

Pivoted to each end of bar 58 see Figs. 6, 20, and 34, is an inwardly or forwardly extending arm 73, to which is secured the transverse bar 57, heretofore referred to. Secured to this bar and aligned with the registering keys is a series of plates 74, the front ends of which are formed with lugs 75, which engage with the upper edges of the blocks 69, and hold the same out of contact with the registering keys when the latter are elevated or in normal position. When, however, one of said keys is depressed, the rear end thereof is elevated, striking the lug of the plate 74 with which it is aligned, throwing all of said plates upward and disengaging them from all the lugs, allowing the connected arms 69 to be forced forward by their springs the said lug in line with the depressed key engaging under the rear end thereof and the other lugs engaging over all the other keys. The depressed key will thus be held in such position and the other keys locked until the cash drawer is pushed in as hereinafter set forth.

Secured to each of the bails 59, see Figs. 5, 17, 20 and 34, is an upwardly extending rod 76, the upper end of which engages with one end of a dog 77, the other end of which is pivoted to the front side of a transverse plate 78, connected with the sides 2 of the apparatus. These dogs, (which correspond in number with the series of indicating keys) are provided with coiled springs 79, connected therewith and with the plate 78.

The plate 78, at suitable intervals apart is provided with a number of slots 80, four being shown in the present instance, through which project rearwardly extending arms 81, 81ª, 81ᵇ, 81ᶜ, which are secured to the transversely movable bars 23, 23ª, 23ᵇ and 23ᶜ, which latter bars as before stated, are connected with the step plates 19, 19ª, 19ᵇ and 19ᶜ, which are engaged, respectively, by the rods 16 of the cents, dimes, dollars and tens of dollars, indicating keys. In rear of and connected with plate 78, is a transversely movable plate 82, having a slot 83 at each end with which engages a headed guide pin on said plate 78. This plate 82 at its upper edges is formed with a number of shoulders or lugs 84, with which the arms 81, 81ª, 81ᵇ, 81ᶜ engage, Figs. 5, 8 and 18.

Located in rear of plate 82, at the center thereof, is a double wedge plate 85, having its opposite sides beveled as seen in Figs. 3, 5 and 7. This plate is vertically movable and works in a guide way formed by a bar 86, secured to plate 82, Figs. 5, 7 and 8. The wedge plate on one side engages with an anti-friction roller 87, journaled on a stud 88, secured to plate 82, while its opposite side engages with a similar roller 89, journaled on a stud 90, on plate 78, a slot 91 being formed in plate 82, through which said stud 90 passes, to allow plate 82 to reciprocate. As said wedge plate moves up and down, as hereinafter set forth, the plate 82 will be reciprocated. The lower end of the wedge block is secured to a curved bar 92, the lower end of which is loosely pivoted to a lug 93, on a transverse bar 94, Figs. 3, 5 and 7. The object of loosely pivoting this bar 92, is to allow the wedge plate to have a slight wobbling or lateral movement. The bar 94, see Fig. 5, extends clear across the apparatus and at each end is connected with arms 96, pivoted at their rear ends to the sides 2, Figs. 2, 3 and 5. At their front ends these arms are formed with slots 97, with which engage anti-friction rollers 98, on studs 99, secured to segments 100, pivoted to the sides 2. These segments are provided with rack teeth 101, and with upwardly extending arms 102, having slots 103 near their upper ends with which engage studs 104, on the outer sides of segment plates 106, pivoted to the sides 2, below the pivotal points of the segments 100. These segment plates are provided with a curved plate 107 and together form a pivoted cover for the cash drawer or till. Said segment plates are connected by a transverse bar 108.

The numeral 109 designates the cash drawer provided at each side with a rack bar 110ª, which engages with the teeth on the segments 100, so that as said drawer is opened and closed, the segments will be oscillated, and through their connection with the plates 106, will turn on their pivots, thus opening and closing said cover. It will thus be seen that the drawer and its cover move in unison, that is to say, if the drawer is pulled out or pushed in, the cover will be opened or closed and vice versa.

Secured to one side of the cash drawer, as seen in Fig. 31, the left in the present instance, is a double rack bar 110 having rack teeth 111 and 111ª, which teeth 111, engages a dog 112, which serves to prevent the drawer from being pushed in when partly opened, thus necessitating the drawer to be pulled entirely out before it can be closed. This dog is secured to the end of a rock shaft 113, journaled in lugs 114, secured to the bottom cross bar of the apparatus. At or near its center this shaft is provided with a crank arm 115, to which is pivoted a vertical rod 116, the upper end of which is screw threaded and passes through a correspondingly threaded aperture in one of the plates 74. See Fig. 3. By this means when a registering key is depressed and the drawer commences to open the plate 74 will be elevated and the shaft actuated to throw the dog into engagement with the rack bar, and when said plate falls when the registering key is returned to normal position, the dog is thrown out of engagement with said bar. Near its end the rack bar is mutilated or cut away, as seen at 118, for a purpose hereinafter explained. See Fig. 31.

Engaging with teeth 111ª of the rack bar 110, is a dog 119, see Figs. 3, 5 and 7, the object of which is to prevent the drawer, after it has commenced to close to be pulled out again until it has been pushed in to its fullest extent or entirely closed. This dog is secured to a shaft 120 journaled in the lugs 114, and provided at or near its center with a crank arm 121, connected by means of a vertical rod 122, with a bell crank lever 123, pivoted to the rod 63. The free or vertical arm of this bell crank lever engages with a downwardly depending lug 123ª on the bar 68, see Fig. 19, so that as said bar is forced forward by depressing a registering key, the dog will be thrown out of engagement with the rack bar. When, however, the said bar 68 is returned to normal position, when the drawer is fully opened, said dog will drop down and engage with the rack bar. The dog will ride over the teeth while the drawer is being pushed in, but an attempt to pull the drawer out before it has been fully closed will be prevented by the dog taking in with said teeth. This is caused by the peculiar shape of the teeth 111 of the rack bar, (which as will be seen are beveled on their rear sides and straight or perpendicular on their front sides) and the tooth 124 on said dog. The dog 112 is formed with a similar tooth 124, while the teeth 111ª with which it engages are formed reversely to said teeth 111, that is to say, the front sides of teeth 111ª are beveled while their rear sides are perpendicular.

The opposite end of shaft 120 is provided with a lateral arm 125 having a stud 125ª which engages with a stud 126, on a bar 127, secured to the opposite side of the drawer, and serves to lock the drawer when closed. When said shaft is actuated as before set forth by depressing a registering key, said arm is thrown out of engagement with the stud allowing the drawer to open.

I will now proceed to describe the means for releasing the indicating and registering keys, after they have been depressed, to return them to normal position. Pivoted to one of the sides 2, (the left in this instance) is a vertical lever 128, see Figs. 2, 3, 5, 7 and 22, the lower end of which is provided with a cam or lug 129, which engages with a stud 130, on one of the arms 96. The upper end of this lever is formed with a notch 131, which engages with the bar 68, so that as said lever is actuated it will force back said bar releasing the registering key and through the medium of rod 71, also forcing back the bails 62 and unlocking the indicating keys. It will be seen that the cam or lug 129 is concavo-convex in shape, and when the arms 96 are actuated when the indicating and registering keys are depressed the upper end of said lever 128 will be out of engagement with the bar 68, so that the latter can move forward. When the drawer has been opened the stud 130 will be at the lower end of the cam or lug 129, so that as said drawer is closed the stud will engage with the rear side of the cam actuating the lever and forcing the bar 68 backward to release the registering keys. A still further movement of the drawer will cause the bar 68 to be still further moved back, when the bar 71 will engage with the bails 62, actuating the latter and releasing the indicating keys.

I will now describe the registering mechanisms. As before stated there are ten in the present instance each of which can be used for a different purpose, that is to say, one may be employed for registering "cash" sales, another for "credit" sales, another for cash taken from the drawer and so on. These registering mechanisms are entirely separate and distinct from each other and are arranged in two rows, parallel rows, one above the other, and are supported by transverse plates 131, Figs. 2, 3, 4, 10 and 12. As these registering mechanisms are exact duplicates of each other, a description of one will suffice for all. Journaled in the plates 131 are a number of shafts 132, there being five shafts for each of said mechanisms in the present instance, although more or less may be employed, if found convenient or desirable. The front ends of these shafts are provided with milled heads 133, for rotating the same and just back of each of these heads is a small dial 134, having thereon numbers running consecutively from "0" to "9." In front of these dials are transverse plates 135, having apertures 136, see Fig. 1, through which said numerals can be viewed, being so constructed that but a single numeral on each dial can be seen at a time. In rear of the dials the shafts are provided with ratchet wheels 137, see Figs. 4 and 12, for a purpose hereinafter described. Also secured to said shafts in rear of the front plate 131 are ratchet wheels 138, see Figs. 4, 8 and 16, with which engage spring pawls 139, to prevent backward movement of the shafts. Each of these wheels 138, is provided on its rear face with a stud 140, which is adapted to engage with a notched wheel 141 on a sleeve 142, slidable and rotatable on the shafts 132. At the rear ends the sleeves are provided with pinions 143, 143$^a$ 143$^b$, 143$^c$, which engage respectively with ratchet teeth 144, on the lower edges of the plates 23, 23$^a$, 23$^b$, 23$^c$, 28, 28$^a$, 28$^b$, 28$^c$. At their rear sides the wheels 141 are formed with annular grooves 145, with which engage the flange 146 of a slidable plate 147. This plate is supported by rods 148, secured to the plates 131, and which pass through apertures in plate 147. At its rear end the plate 147 is provided with a rearwardly extending pin 148$^a$ which passes through an aperture in the rear plate 131. These pins are adapted to engage with a beveled recess or notch 149 formed in the inner face of a disk 150, pivoted to the rear plate 131, and connected with the upper arm 67, of the jointed connecting rod attached to the rear end of the registering key, so that when said key is depressed the rod will be elevated, turning or rotating disk 150 and causing the beveled wall of the recess or notch to engage with the pin 148$^a$, pushing it and the plate 147 forward, and through the medium of flange 146, forcing all the sleeves 142 forward so that the notched wheels thereon will engage with the studs 140 on the ratchet wheels 137. If one of the plates or bars 23, 23$^a$, 23$^b$, 23$^c$, 28, 28$^a$, 28$^b$ or 28$^c$, be now actuated, as hereinafter described, the sleeve and shaft connected therewith will be rotated a distance corresponding with the movement of said plate or bar, and the dial of the shaft be correspondingly rotated. Coiled springs 151, return plate 147 to normal position after the registering key is released and the notched or recessed disk is rotated in opposite direction thereby.

As before stated, there are five dials, in the present instance, for each registering mechanism, representing, respectively, "cents," "dimes," "dollars," "tens of dollars," and "hundreds of dollars," the "cents" dial being at the extreme right. In practice it is necessary that means be provided whereby when one dial has made a complete revolution, the next dial of higher value be moved one point. For instance in beginning work all the dials are set at zero, and if nine sales of one cent each be made, the numerals from 1 to 9, will successively appear at the view opening of the cents dial. If now, another sale be made the dimes dial should move one point, thus indicating that the cents dial has made one complete revolution the numeral "1" appearing at the view opening of the "dimes" dial. This I accomplish as follows: Pivoted to the front plate 131, see Figs. 4, 12 and 14, is a trip lever 152, of peculiar construction comprising an upwardly extending arm 153, having a stud 154 at its upper end, a downwardly extending arm 155 having two beveled notches 156 and 157 at its lower end and a laterally extending bent arm 158. There is one of these levers at the left of each dial except the one on the extreme left. The pivots of these levers are slightly below the dials shafts, so that the arm 158, will extend up just underneath the shaft to its right, so that it will be engaged by a lug or pin 159, on said dials, which lug is just in rear of the numeral 4 of the dial. The arm 53 will extend up around the shaft of the next dial as seen in Fig. 12. Secured to the lower edge of the plates 131 are a number of flat springs 154$^a$, one for each lever 152, the free ends of which engage with the notches in arms 153. Located above each of the front plates 131, is a transversely movable plate 160, extending nearly to each side of the apparatus. In the ends of these plates are formed slots 161, which engage with the lugs 162, on the sides 2. These plates are connected together by bars 163, so as to move in unison. Pivoted to the plates 131, at the right of each registering mechanism, is a two armed lever 164, having a stud 165 on the rear side which engages with slots 166, in the plates 160. See Fig. 12. The long arms of the levers 164, are provided with a series of spring actuated pawls 167, which are adapted to engage with the studs 154 of the arms 153, of levers 152, as said levers 164 are moved down by the movement of the plate 160. The levers 164, see Fig. 15, where the pawls 167 are secured thereto are formed with a screw threaded aperture 168, a boss 169 and an annular recess 170. The pivot screw 171 fits into aperture 168, while in the recess 170, is seated a coiled spring 172. The ends of the spring are bent outwardly and one of such ends is engaged with a hole 173 in the lever, while the other end engages with a hole 174 in the pawl. By this means the spring is entirely concealed within the recess in the lever and thus protected from injury. The head of the pivot pin is countersunk in the pawl, and the lever is provided with studs 175, which form stops for the pawls.

The levers and their pivots as seen in Fig. 33 are formed similarly to the pawls and their pivots, that is to say, the plates 131, are formed with screw-threaded apertures 176, bosses 177, annular recesses 178, in which are seated springs 179 which have bent ends engaging respectively with plates 131 and with the levers. The object of these springs is to return the plates 160, to normal after they have been actuated, by the means which will now be described.

Pivoted to the arm 96 at the right of the apparatus, see Figs. 2 and 7, is an upwardly extending spring-actuated arm 180, having a curved upper end 181 and a shoulder 182, which shoulder is adapted to engage with a foot 182$^a$ on the lower end of a vertically movable bar 182$^b$. See Fig. 2, 7, 12 and 23. The upper end of this bar is beveled forming a wedge-shaped head 183, which engages with a friction roller 184, so that when said bar is elevated by the movement of the cash drawer said beveled portion will engage with the roller and move the connected plates 160 toward the left of the machine or apparatus. As the arm 180 is elevated its curved upper end will strike a beveled lug 185, see Fig. 2, on one of the sides 2, which will throw it out of contact with the foot 182$^a$ of the bar 182$^b$, allowing the latter to fall. A coiled spring 186 secured to said lug aids in forcing said arm down, and a stud or stop 187, on said arm limits its downward movement. The movements of the parts just described are so timed, that the bar 182$^b$ will commence its upward stroke just after the drawer has commenced to move inward and will be released just before said drawer is closed. Pivoted to said side 2 of the apparatus is a lever 188, see Fig. 2, the upper end of which is formed into a hook 189, which is adapted to engage with a notch 190, see Figs. 6, 20, and 34, in one of the plates 74, at the right of the apparatus, while its lower end engages with the rear end of the rack-bar 110$^a$, at the right of the cash drawer. The object of this construction is to lock the registering key after the drawer is opened and keep it locked until the drawer is closed, as otherwise the apparatus might be injured or damaged if the said key could be depressed again after it had been returned to normal position and before the drawer had been closed.

The numeral 191 designates a coiled spring connected with the rear end of the sliding cash drawer and pivoted cover for closing the same after having been opened.

The numeral 192 designates transverse bars, on the ends of which are journaled rollers 193, on which the cash drawer rides.

The operation is as follows: At the commencement of a day's work the keys will all be elevated and the display plates or disks and the dials all set at zero. Supposing now that a sale amounting to say five cents is made, then the "5" cent key in the series of indicating keys at the right of the apparatus is depressed, elevating its rear end, which in turn will elevate the rod 16 resting on said key, causing its upper end to project up a short distance above the plate 15, so that said pin will lie in the path of the fifth step in the plate 19. At the same time the said rear end of the key will strike the bail 59, elevating the same and releasing the vertical bail 62, allowing the latter to be pulled forward by its spring, so that the plate 61 secured thereto will engage under the rear end of the key depressed and over the ends of all the other keys in the series, thus locking said keys. As the bail 59 thus rises, by means of a connecting rod 76, it will raise the dog 77, releasing the arm 81, of the movable plate 23. By now depressing a registering key, say for instance, the upper one at the extreme right of the apparatus, numbered 2 in the drawings, the rear end thereof will be elevated raising the plates 74, releasing bar 59, allowing it to move forward and one of the blocks 69 to engage under said rear end and hold it in such position, while all the other blocks will engage over the ends of the rest of said keys and lock them. At the same time one of said blocks will strike the bell crank lever 123, actuating the same, and through the connections, turning shaft 120, so that the dog 119 will be thrown out of engagement with rack-teeth 111$^a$ of the cash drawer, and the stud 125$^a$ of arm 125, out of engagement with the stud 126 on bar 127, thus allowing the drawer to open. As the drawer opens the dog 112 will engage with rack-teeth 111, thus preventing backward movement of the drawer. As the drawer moves outward by means of the connections with the pivoted cover, the latter will be swung backward on its pivots, thus uncovering the drawer. Just as the cash drawer commences to open, by means of the rack bars 110 and segments 100, the arms 96 will be actuated, depressing bar 94, which in turn will lower plate 85, allowing the connected plates 23 and 28 to be moved to the left of the machine, the arm 81, as before stated, having been disengaged from dog 77, thus permitting of such movement of plate 81, the movement being effected by the coiled spring 30 connected therewith. As the plate 81 is thus actuated, the step plate 19, connected therewith, will also be moved until the fifth step thereon comes in contact with the rod 16, elevated by the said five cent key as aforesaid, when the movement thereof, as well as of the plates 23 and 28, will be checked. The movement of said plates will thus be regulated by the indicating key depressed. As the plate 28 is thus moved the rack-bar 36, connected therewith, will be correspondingly moved, causing the display disks at the front and rear of the apparatus to move a sufficient distance to bring the numeral "5," thereon, into register with the view openings of the plates in front and rear thereof respectively. The rotation of the disks is effected through the medium of the pinions connected with their shafts. As the plates 74 are elevated as aforesaid by the depression of the registering key, the bar 57 will be elevated, raising rod 56, and rotating disk 54, and shaft 52, the rib 53 of the latter engaging with the hooks 49 and throwing them out of engagement with the grooves 50 in plate 51, so that the bars 36 can move with the plates 38. After the bar 38 has actuated the display disk, and just as the drawer commences to close, the rib 53, will, through a reverse movement of its connections, be lowered, thus allowing the hook which has been moved by bar 36, to engage with one of said grooves, and be held in this position, until a registering key is again depressed, the disks also being retained in position.

When the registering key is depressed, as set forth, the two-part jointed rod 66, 67, will be actuated turning the disk 150 connected therewith, so that its beveled notch will engage with the rear end of pin 148, forcing the slidable plate 147, forward, and also forcing all the sleeves 142, of the registering mechanism forward, so that the pinions 143, 143$^a$, 143$^b$, and 143$^c$, will engage with the studs 140, so as to rotate with any of the shafts 132, which may be rotated. As the drawer continues its opening movement, sliding bar 28 to the left, as before stated, the ratchet teeth on the lower edge thereof engaging with the pinions 143, 143$^a$ 143$^b$ and 143$^c$ rotating all of them, together with their sleeves 142, but as only the sleeves of the registering mechanism of the key depressed and their notched wheels have been thrown into engagement with the studs 140, only the shaft of this registering mechanism will be rotated. It will also be noted that only the shaft 132, (the pinion of which meshes with the bar or plate 28 which is actuated) will be actuated, and its dial rotated to register the amount of the sale. The shafts and dials mechanism thus thrown into operative engagement will then be rotated by any or all of the bars or plates 23, 23$^a$ 23$^b$, 23$^c$, 28, 28$^a$, 28$^b$, or 28$^c$, as the case may be. In the present instance, the "cents" bar or plate 28 being the only one actuated, the cents dial of the registering mechanism at the upper right hand corner of the apparatus, will be the only one actuated, and, as before stated, the said bar or plate will move a distance corresponding with the indicating key depressed, and as the "5" cent key was depressed said bar or plate will move five points and the dial be correspondingly rotated, so that the numeral "5" will appear at the view opening in the plate in front of the dial.

When the drawer is fully opened the stud 130 of lever 96, will lie against the lower end of the lug or cam 129, on the arm 128, and the dog 112 will have ridden out of engagement with the rack-teeth 111, onto the mutilated portion of the rack-bar 110, this mutilated portion being essential in order to allow the drawer to be pushed in slightly, so as to trip said dog, as otherwise it would be impossible to move said drawer. The drawer is now pushed inward, (the dog 112 riding on said mutilated portion of the rack-bar) when the pivoted cover connected with the drawer will commence to move, causing arm 96, to rise and the stud 130 to engage with the rear side of the cam 129 throwing the upper end of lever 128 to be moved rearwardly, striking the bar 68, and forcing it rearwardly, releasing the registering keys. When said bar 68 is thus returned to normal the plates 74 will drop down and engage with the upper ends of the blocks 69 and thus hold the bar in such position. At the same time the rod 116 and crank 115 will actuate or turn back shaft 113 throwing dog 112 out of engagement with the rack-teeth 111, so that the drawer can close. These movements take place just after the drawer commences to close, and as the registering key which has been depressed returns to normal, the disk 150 will be actuated to throw the devices connected therewith out of engagement with the dial shafts. As the drawer continues its inward movement the stud 130 by intermediate mechanism acting upon bar 68 will move the latter slightly farther back so that the rod 71, connected therewith, will strike the bails 62, forcing them backward and releasing the indicating keys. The bails 59 will then drop down and engage with and hold bails 62 in normal position to which they have been returned. As the plates 74 and the connected cross-bar 57 are returned to normal, the disk 54, by means of rod 56 is rotated so that the plate or rib 53 of shaft 52 will fall down, allowing the hook which had been actuated by rack-bar 36 to fall and engage with one of the grooves 50 of plate 51.

As the cash drawer commences its inward movement as aforesaid, the pivoted cover connected therewith, will move simultaneously therewith, and through the medium of arms 96 and connections will raise bar 94, elevating bar 92 and wedge block 85 forcing the plate 82 backward or toward the right of the apparatus. The arm 81 of the bar 23, will be engaged by one of the shoulders 84 in the movement of said plate, so as to return plates 19 and bars 23 and 28, to normal position. The rack bar 36 which was operated by the forward or first movement of said plates and bars, will not now return to normal, because of its hook being engaged in the groove 50, but upon a registering key being again depressed to register another sale the rib 53, will release said hook and allow the rack-bar and display plates and disks to return to their first position by the coiled spring connected with said bar 36.

Just as the cash drawer commences its closing movement, and the registering key has been returned to normal and the plates 74 fall down, the lever 188 will engage with the plate 74 at the right of the apparatus, and thus hold all of said plates down, preventing any of the registering keys from being depressed until the drawer has been completely closed, when the rear end of the rack-bar 110 will strike the lower end of said lever and release the plate 74, so that a registering key may be depressed.

In the foregoing description, I have described the operation of the apparatus when but a single indicating key in the cents series has been depressed. It is obvious that an indicating key in all or any of the series, may be depressed, either simultaneously or successively, and the operation will be the same.

I will now describe the operation of the devices for transferring the amounts registered on one of the registering dials to an adjoining dial of a higher value, so that when said dial of a less value has made a single revolution, the next dial of a higher value will be moved a single point. Supposing now that sales to the amount of nine cents have been made and the cents dial of one of the registering dials shows the numeral "9" through the view opening, and that another sale, say of five cents is made, then the cents dial will be moved five points, so that the numeral "4" will appear thereon and the dimes dial will be moved one point, thus indicating that sales aggregating fourteen cents have been made. This is accomplished as follows: When the numeral "9" appears at the view opening the lug or pin 159 on the cent's dial shaft will bear against the bent arm 158 of the trip lever 152, so that when the apparatus is again operated to register the five cents, as before stated, said cents dial will be moved five points and the said lug or pin engaging with the arm 158 will trip the lever, so that stud 154, of arm 153, will lie in the path of the first pawl 167 on the lever 164 of the registering mechanism with which the registering key depressed is connected. This shifting of the trip lever causes its spring 154$^a$ to be disengaged with notch 156, and to engage with the other notch 157, in said lever, the tension of the spring holding the lever in its shifted or tripped position.

As the drawer now closes by means of the arm 180, connected with arm 96, at the right of the apparatus, the bar 182, and its wedge-shaped head 183 will be elevated and the plates 131 will be moved to the left, which in turn will move the levers 164 downward on their pivot, carrying with them the pawls 167. It will be seen that all the pawls, except the one corresponding with the trip lever which has been shifted, will pass by the studs 154, without being actuated thereby. Said last mentioned pawl, however, will come in contact with the stud 154, lying in its path, and be deflected to the right, so that it will engage with one of the teeth of the ratchet wheel 137, of the dimes shaft, causing said wheel to be moved one point, the mechanism then registering fourteen cents. Just as the point of the pawl engages with the ratchet wheel 137, as stated, further movement or deflection to the right thereof is prevented, so that as said pawl continues its downward movement, to rotate said wheel, it will shift the trip lever to the left, through the medium of stud 154, on its arm 153, overcoming tension of spring 154$^a$ and restoring the trip lever to normal position. This movement will disengage said spring from notch 157, and cause it to again engage with notch 156. When the drawer reaches the end of its inward movement and the arms 96 are about at the end of their upward movement, the arm 180 will be tripped by the beveled lug 185, releasing bar 182 allowing it to fall and the plates 160 to be moved back to normal position by the coiled springs forcing upward levers 164.

A cash register constructed as above with a sliding cash drawer and a hinged cover moving in unison with each other, so as to open and close simultaneously, will afford ample space so that access can be had to all parts of the drawer or till, without the drawer being forced out to its fullest extent. In practice, the drawer will open only about half way.

When I state the cash drawer and its cover move in unison, I do not mean that they move at the same rate of speed, as it is preferable that the movement of the drawer be somewhat greater than that of the cover, so that the former will have to move quicker than the latter in order that they will open and close simultaneously. This is accomplished by the peculiar construction and arrangement of the connections.

Having thus described my invention, what I claim is—

1. In a cash register, the combination with the sliding drawer and pivoted cover, of the coiled springs connecting the same together, substantially as and for the purpose specified.

2. In a cash register, the combination with the casing, and the sliding cash drawer having rack bars at its sides, of the pivoted segments, having rack teeth engaging therewith and provided with an upwardly extending arm formed with an elongated slot, the segment plates pivoted to said casing having a stud engaging with said slots, the bent plate or cover, the transverse bar connecting said segment plates, and the coiled spring connected with said bar and with the inner end of the cash drawer, substantially as described.

3. In a cash register the combination with the casing, and the sliding cash drawer having rack-bars at its sides, of the pivoted segments having rack-teeth engaging therewith, and provided with an upwardly extending arm formed with an elongated slot, the segment plates pivoted to said casing having a stud engaging with said slots and the bent plate or cover, substantially as described.

4. In a cash register the combination with the casing and the sliding drawer provided with rack bars at the sides, of the segment pivoted to the sides of the casing having rack teeth and provided with an upwardly extending slotted arm, the segment plates pivoted to the sides of the casing below the pivotal points of the segments, the studs on said plates and the curved or bent plate or cover, substantially as described.

5. In a cash register the combination with the cash drawer having a mutilated rack bar at one side, of the dog adapted to engage with said rack-bar and prevent backward movement of the drawer, the rock-shaft to which said dog is secured, the crank and upwardly extending rod connected with said shaft, the plate to which said rod is connected, the cross bar to which said plate is secured and the registering key for elevating said bar and plate and actuating the rock-bar to throw the dog into engagement with the rack-bar, substantially as described.

6. In a cash register, the combination with the cash drawer having a mutilated rack-bar at one side, of the dog adapted to engage with said rack-bar and prevent backward movement of the drawer, the rock shaft to which said dog is secured, the crank and upwardly extending rod connected with said shaft, the plate to which said rod is connected, the cross-bar to which said plate is secured, the registering key for elevating said plate and bar to throw the dog into engagement with the rack-bar, the oscillating spring-actuated bail for retaining the said key in position, and means substantially as described for actuating said bail and releasing the key and plate and throwing the dog out of engagement with the rack-bar.

7. In a cash register, the combination with the pivoted till or drawer cover and the sliding cash drawer having a mutilated rack-bar at one side, of the dog adapted to engage with said rack-bar, and prevent backward movement of the drawer, the rock-shaft to which said dog is secured, the crank and upwardly extending rod connected with said shaft, the plate to which said rod is connected, the cross bar to which said plate is secured, the registering key for elevating said plate and bar to throw the dog into engagement with the rack-bar, the oscillating spring-actuated bail for retaining said key in position, the pivoted lever the upper end of which engages with said bail and means substantially as described, by which said lever is actuated by the movement of the cash drawer to operate the bail and release the key whereby the dog is thrown out of engagement with the rack-bar.

8. In a cash register, the combination with the pivoted till or drawer cover and the sliding cash drawer having a mutilated rack-bar at one side, of the dog adapted to engage with said rack-bar and prevent backward movement of the drawer, the rock-shaft to which said dog is secured, the crank and upwardly extending rod connected with said shaft, the plate to which said rod is connected, the cross bar to which said plate is secured, the registering key for elevating said plate and bar to throw the dog into engagement with the rack-bar, the oscillating spring-actuated bail for retaining said key in position, the pivoted lever the upper end of which engages with said bail, the cam near the lower end of said lever, the pivoted arm having a stud adapted to engage with said cam and means substantially as described, for actuating said arm by the movement of the cash drawer to throw the dog out of engagement with the rack through the connections herein specified.

9. In a cash register, the combination with the pivoted till or drawer cover provided with a stud, the pivoted segment having rack teeth and an arm formed with an elongated slot with which said stud engages, and the sliding cash drawer having a rack bar with which said segment engages, and a mutilated rack bar, of the dog adapted to engage with said mutilated rack bar to prevent backward movement of the drawer, the rock shaft to which said dog is secured, the crank and upwardly extending rod connected with said shaft, the plate to which said rod is connected, the cross bar to which said plate is secured, the registering key for elevating said plate and bar to throw the dog into engagement with the rack bar, the oscillating spring actuated bail for retaining said key in position, the pivoted lever, the upper end of which engages with said bail, having a cam near its lower end, the pivoted arm having a stud adapted to engage with said cam and formed with a slot at its front end and a wheel, journaled on a stud on said segment, engaging with said slot; substantially as and for the purpose specified.

10. In a cash register the combination with the sliding cash drawer, having a rack bar on one side, of the dog adapted to engage with said rack bar to prevent outward movement of the drawer after it has commenced to close, the rock shaft to which said dog is secured, the crank and upwardly extending rod connected with said shaft, the bell crank lever with which said rod is connected and means substantially as described for actuating said rock shaft to throw the dog into and out of engagement with the rack bar.

11. In a cash register, the combination with the sliding till or cash drawer, having a rack bar at one side, of the dog adapted to engage with said rack bar to prevent outward movement of the drawer after it has commenced to close, the rock shaft to which said dog is secured, the crank and upwardly extending rod connected with said rock shaft, the bell crank lever to which said rod is connected, the oscillating spring actuated bail engaging with said lever and the registering key for releasing the bail to operate said lever and throw the dog out of engagement with the rack bar; substantially as described.

12. In a cash register, the combination with the sliding till or cash drawer having a rack bar at one side, of the dog adapted to engage therewith to prevent outward movement of the drawer after it has commenced to close, the rock shaft to which said dog is secured, the crank and upwardly extending rod connected with said rock shaft, the bell crank lever with which said rod is connected, the oscillating spring actuated bail engaging with said lever, the hooked plate for holding said bail in place, the cross bar to which said plate is secured, the registering key for elevating said plate and releasing the bail, and means substantially as described for returning said bail to normal position to throw the dog out of engagement with the rack bar.

13. In a cash-register the combination with the pivoted till or drawer cover having studs on the sides, the pivoted segment having rack teeth, slotted arms and anti-friction rollers, the sliding cash drawer having rack bars at the sides with which said segments engage and a rack bar at one side with which a dog engages, of the rock shaft, the dog carried thereby engaging with said rack bar, the crank and upwardly extending rod connected with said shaft, the bell crank lever to which said rod is connected, the spring actuated oscillating bail engaging with said lever the hooked plate for holding said bail in position, the cross bar to which said plate is secured, the registering key for elevating said plate and bar, the pivoted lever engaging with said bail having a cam near its lower end and the slotted arms engaging with said rollers, one of which arms is provided with a stud adapted to engage with said cam; substantially as and for the purpose specified.

14. In a cash register, the combination with the sliding till or cash drawer, having a bar at one side provided with a lug, of the rock shaft having a crank at one end provided with a stud adapted to engage with said lug and lock the drawer when closed, the crank and upwardly extending rod connected with said rock shaft, the bell crank lever to which said rod is connected, the oscillating bail engaging with said lever, the hooked plate engaging with said bail and the registering key for elevating said bail and releasing the bail to throw the dog out of engagement with the rack bar; substantially as described.

15. In a cash register of the character described, the combination with the indicating keys arranged in series of nine each, of the vertically movable diagonally arranged rods or bars resting upon the rear ends of said keys, the horizontally movable plate and the series of plates secured thereto having step notches aligned with said rods; substantially as and for the purpose specified.

16. In a cash register of the character described, the combination with the indicating keys arranged in series of nine each, as shown, of the vertically movable diagonally arranged rods resting upon the rear ends of said keys, the series of plates having step notches aligned with said rods, the transversely movable spring actuated bars, connected with said plates, and provided with lugs, the transversely movable rack bars having downwardly depending lugs adapted to be engaged by said lugs and the rotatable display disks having pinions engaging with said rack bars, by which said display disks are actuated; substantially as specified.

17. In a cash register of the character described, the combination with the indicating keys arranged in series of nine each, as shown, of the vertically movable diagonally arranged rods resting upon the rear ends of said keys, the series of beveled plates formed with step notches aligned with said rods, the transversely movable spring actuated bars connected with said plates and provided with lugs, the transversely movable rack bars having overlapping ends, the lugs on said rack bars adapted to be engaged by the lugs on said bars, the front and rear rotatable display disks having numerals on their outer faces arranged in pairs on suitable shafts and provided with pinions engaging with said rack bars, and diagonally connected together by said rack bars; substantially as and for the purpose specified 18. In a cash register of the character described, the combination with the rotatable display plates and the spring actuated rack bars for actuating the same, of the pivoted hooks, the grooved plates with which said hooks engage and means for throwing said hooks into and out of engagement therewith; substantially as specified.

19. In a cash register of the character described, the combination with the rotatable display disks provided with pinions, the rack bars meshing with said pinions and provided with pivoted hooks, of the grooved plate with which said hooks engage and means for throwing said hooks into and out of engagement therewith; substantially as specified.

20. In a cash register of the character described, the combination with the rotatable display plates provided with pinions, the rack bars meshing therewith, the pivoted hooks and grooved plate, of the shaft having a rib engaging with said hooks, the disk on the end of said shaft, the vertical rod, the cross bar to which said rod is connected, the hooked plates secured to said cross bar, the oscillating bail with which said plates engage and the registering key for elevating said plate and bar and actuating the shaft to throw the hooks into and out of engagement with the grooved plate; substantially as and for the purpose specified.

21. In a cash register of the character described, the combination with the rotatable display plates provided with pinions, the spring actuated rack bars meshing therewith, the pivoted hooks and grooved plate, of the shaft having a rib engaging with said hooks, the disk and rod, the cross bar with which said rod is connected, the hooked plates secured to said rod, the oscillating bail with which said plates engage, the registering key for elevating said plates and rod, the pivoted lever engaging with said bail having a cam near its lower end, the forwardly extending pivoted arm having a stud engaging with said cam and means substantially as described for actuating said arm by the movement of the cash drawer; as and for the purpose specified.

22. In a cash register of the character described, the combination with the rotatable display plates, the rack bars for actuating the same, the pivoted hooks, the grooved plate with which they engage, the ribbed shaft having a disk and connecting rod, the cross bar to which said rod is attached, the hooked plates secured to said cross bar, the oscillating bail and the registering key, of the transversely movable spring actuated bars, having lugs adapted to engage with lugs on said rack bars, the beveled plates having step notches, the diagonally arranged vertically movable rods aligned with said step notches, and the indicating keys for actuating said rods; substantially as and for the purpose specified.

23. In a cash register of the character described, the combination with the rotatable display plates, the rack bars for actuating the same, the pivoted hooks, the grooved plate with which they engage, the ribbed shaft having a disk and a rod, the cross bar with which said rod is connected, the hooked plates secured to said cross bar, the oscillating bail, the registering key, the lever with which said bail engages having a cam near its lower end, the pivoted arms one of which has a stud adapted to engage with said cam and means for actuating said arms by the movement of the cash drawer, of the transversely movable spring actuated bars, having lugs adapted to engage with lugs on said rack bars, the beveled plates connected with said bars formed with step notches, the vertically movable diagonally arranged rods aligned with said step notches, and the indicating keys, substantially as and for the purpose specified.

24. In a cash register, the combination with the rotatable display plates, the spring actuated rack bars for actuating the same provided with lugs, the pivoted hooks, the grooved plate with which they engage, the ribbed shaft having a disk and a rod, the cross bar with which said rod is connected, the hooked plates secured to said rod, the oscillating bail with which said plates engage the registering key for elevating said plates and rod, the pivoted lever engaging with said bail having a cam near its lower end, the slotted arm having a stud engaging with said cam, the pivoted segment engaging with said arm having rack teeth and a slotted arm, the pivoted till or drawer cover having a stud engaging with said slotted segment arm, and the sliding cash drawer having a rack bar with which said segment engages, of the transversely movable spring actuated bars having lugs engaging with the lugs of the rack bars, the beveled plates connected with said bars formed with step notches, the vertically movable diagonally arranged rods aligned with said step notches and the indicating keys for actuating said rods; substantially as specified.

25. In a cash register of the character described, the combination with the indicating keys, and the vertical and horizontal bails in rear thereof, of the upwardly extending rods, connected with said horizontal bails, the pivoted dogs with which said rods engage, the transversely movable bars, the arms connected with said bars with which the dogs engage, the transversely movable plate having shoulders engaging with said arms; substantially as specified.

26. In a cash register of the character described, the combination with the indicating keys, and the vertical and horizontal bails in rear thereof, of the upwardly extending rods, connected with said horizontal bails, the pivoted dogs with which said rods engage, the transversely movable bars, the arms connected with said bars, the transversely movable plate having shoulders engaging with said arms, the wedge plate and guide and rollers, the curved bar secured to said wedge plate, the cross bar to which said bar is pivoted, the forwardly extending pivoted arms to which said cross bar is secured, and means, substantially as described, for actuating said arms and cross bar by the movement of the cash drawer, and elevating the wedge plate; as and for the purpose specified.

27. In a cash register of the character described, the combination with the indicating keys, and the vertical and horizontal bails in rear thereof and the upwardly extending rods connected with said horizontal bails, of the pivoted dogs with which said rods engage, the transversely movable bars the arms secured thereto, the transversely movable plate having shoulders engaging with said arms, the wedge plate and rollers by which said plate is actuated, the curved bar secured to said wedge plate, the cross bar to which said bar is pivoted, the forwardly extending pivoted and slotted arms to which said cross bar is secured, the sliding cash drawer having rack bars at its sides, the segment having rack teeth engaging therewith and formed with slotted arms, and the pivoted cover having studs engaging with said slot and wheels or studs engaging with said forwardly extending slotted arms; substantially as specified.

28. In a cash register of the character described, the combination with the indicating keys, the vertical and horizontal bails in rear thereof, and the upwardly extending rods connected with said horizontal bails, of the pivoted dogs with which said rods engage, the transversely movable spring actuated bars having rearwardly extending arms secured thereto, and provided with lugs, the transversely movable plate having shoulders engaging with said arms, the transversely movable spring actuated rack bars having lugs engaging with the lugs on said bars, the display disks and pinions engaging with said bars, and means for actuating said transversely movable plate, substantially as and for the purpose specified.

29. In a cash register of the character described, the combination with the indicating keys, the vertical and horizontal bails in rear thereof and the upwardly extending rods connected with said horizontal bails, of the pivoted dogs with which said rods engage, the transversely movable spring actuated bars provided with lugs and rearwardly extending arms, the transversely movable plate having shoulders which engage with said arms, the transversely movable spring actuated rack bars, the rotatable display disks having pinions with which said rack bars engage, the hooks pivoted to said rack bars, and the grooved plate with which they engage the ribbed shaft for disengaging said hooks from the grooves, and means for actuating said shaft; substantially as specified.

30. In a cash register of the character described, the combination with the indicating keys, the vertical and horizontal bails in rear thereof and the upwardly extending rods connected with said horizontal bails, of the pivoted dog with which said rods engage, the transversely movable spring actuated bars provided with lugs, the transversely movable rack bars having lugs engaging therewith, the display disks having pinions engaging with said rack bars, the pivoted hooks connected with said bars, the grooved plate with which said hooks engage the ribbed shaft for disengaging said hooks from the groove and means for actuating the same, the rearwardly extending arms secured to said transversely movable bars, the transversely movable plate having shoulders engaging with said arms, the wedge plate and rollers, the curved bar to which said wedge plate is secured, the cross bar connected therewith, the forwardly extending arms to which said cross bar is secured and means substantially as described for actuating said arms by the movement of the cash drawer, for the purpose specified.

31. In a cash register of the character described, the combination with the indicating keys, the vertical and horizontal bails in rear thereof, and the upwardly extending rods connected with said horizontal bails, of the pivoted dogs with which said rods engage, the transversely movable spring actuated bars provided with lugs, the spring actuated rack bars having lugs engaging therewith, the display disks having pinions engaging with said rack bars, the pivoted hooks connected with said rack bars, the grooved plate with which said hooks engage the ribbed shaft and means for actuating the same, the rearwardly extending arms secured to said transversely movable bars, the transversely movable plate having shoulders engaging with said arms, the wedge plate and rollers, the curved bar to which said wedge plate is secured, the cross bar connected therewith, the forwardly extending pivoted arms to which said cross bar is secured and means substantially as described for actuating said arms by the movement of the cash drawer.

32. In a cash register of the character described, the combination with the indicating keys, the vertically movable diagonally arranged rods with which said keys engage, the plates formed with steps, aligned with said rods, the transversely movable spring actuated bars connected with said plates, and the spring actuated rack bars and display disks, of the vertical and horizontal bails located in rear of said keys, the upwardly extending rods connected with said horizontal bails, the pivoted dogs engaging therewith, the arms secured to said transversely movable bars and the transversely movable plate having shoulders engaging with said arms; substantially as specified.

33. In a cash register of the character described, the combination with the indicating keys, the vertically movable diagonally arranged rods with which said keys engage, the transversely movable plates formed with steps aligned with said rods, the transversely movable spring actuated bars connected with said plates and the spring actuated rack bars and display disks, of the vertical and horizontal bails located in rear of said keys, the upwardly extending rods connected with said horizontal bails, the pivoted dogs engaging therewith, the arms secured to said transversely movable bars, the transversely movable plate having shoulders engaging with said arms, the rollers and wedge plate, the curved bar to which said wedge plate is secured, the cross bar to which said bar is pivoted, the forwardly extending pivoted arms, secured to said cross bar, and means substantially as described for actuating said pivoted arms by the movement of the cash drawer, for the purpose specified.

34. In a cash register of the character described, the combination with the indicating keys, the vertically movable diagonally arranged rods with which said keys engage, the transversely movable plates formed with steps aligned with said rods, the transversely movable spring actuated bars connected with said plates, the spring actuated rack bars, and the display disks, of the vertical and horizontal bails located in rear of said keys, the upwardly extending rods connected with said horizontal bails, the pivoted dogs engaging therewith, the arms secured to said transversely movable bars, the transversely movable plate having shoulders engaging with said arms, the rollers and wedge plate, the curved bar to which said wedge plate is secured, the cross bar to which said bar is pivoted, the forwardly extending slotted and pivoted arms secured to said cross bar, the sliding till or cash drawer having rack bars at its sides, the pivoted segment having rack teeth engaging therewith, and provided with an upwardly extending slotted arm and with a stud and roller or wheel engaging with the forwardly extending slotted arms; substantially as specified.

35. In a cash register of the character described, the combination with the indicating keys, the vertically movable diagonally arranged rods, the transversely movable plates formed with steps aligned with said rods, the transversely movable spring actuated bars connected therewith provided with lugs on their upper sides, the transversely movable rack bars having lugs engaging therewith, the rotatable display disks having pinions engaging with said rack bars, the hooks pivoted to said rack bars the grooved plate with which they engage and the ribbed shaft and means for actuating the same, of the vertical and horizontal bails located in rear of said keys, the upwardly extending rods connected with said horizontal bails the pivoted dogs with which said rods engage, the rearwardly extending arms secured to said transversely movable bars, and the transversely movable plate having shoulders engaging with said arms; substantially as specified.

36. In a cash register of the character described, the combination with the indicating keys, the vertically movable diagonally arranged rods, the transversely movable plates formed with steps aligned with said rods, the transversely movable spring actuated bars connected therewith and provided with lugs, the transversely movable rack bars having lugs engaging therewith, the rotatable display disks having pinions engaging with said rack bars, the hooks pivoted to the rack bars the grooved plates with which they engage and the ribbed shaft and means for actuating the same, of the vertical and horizontal bails located in rear of said keys, the upwardly extending rods connected with said horizontal bails, the pivoted dogs with which said rods engage, the rearwardly extending arms secured to said transversely movable bars having shoulders engaging with said arms, the rollers and wedge plate, the curved bar secured to the wedge plate, the cross bar to which said bar is pivoted, the forwardly extending pivoted arms secured to said cross bar, and means for actuating said arms by the movement of the cash drawer; substantially as specified.

37. In a cash register of the character described, the combination with the indicating keys, the vertically movable diagonally arranged rods, the transversely movable plates formed with steps aligned with said rods, the transversely movable spring actuated bars connected therewith, and provided with lugs, the transversely movable rack bars having lugs engaging therewith, the rotatable display disks having pinions engaging with said rack bars, the hooks pivoted to the rack bars, and the grooved plates with which they engage and the ribbed shaft and means for actuating the same, of the vertical and horizontal bails located in rear of said keys, the upwardly extending rods connected with said horizontal bails, the pivoted dogs with which said rods engage, the rearwardly extending arms secured to said transversely movable bars, the transversely movable plate having shoulders with which said arms engage, the rollers and wedge plate, the curved bar secured to said wedge plate, the cross bar to which said bar is pivoted, the forwardly extending pivoted and slotted arms secured to said cross bar, the sliding drawer provided with rack bars at the sides, the pivoted segment having rack teeth engaging therewith, and provided with a slotted arm, the pivoted cover having a stud engaging with said slot, and the anti-friction wheel journaled on said segment and engaging with said pivoted arms; substantially as specified.

38. In a cash register, the combination with the registering keys, of the spring actuated bail having vertical arms provided with blocks adapted to engage with and lock the keys, the cross bar and hooked plates secured thereto for holding said bail in place, the pivoted lever adapted to engage with said bail, having a cam near its lower end, the forwardly extending pivoted arms one of which is provided with a stud which engages with said cam, and means substantially as described for actuating said arms by the movement of the cash drawer.

39. In a cash register, the combination with the registering keys, of the spring actuated bail, having vertical arms provided with blocks, adapted to engage with and lock said keys, the cross bar and hooked plates secured thereto for holding the bail in place, the pivoted lever adapted to engage with said bail, having a cam near its lower end, the forwardly extending pivoted and slotted arms one of which is provided with a pin adapted to engage with said cam, the pivoted segments having a slotted arm and rack teeth and a wheel or roller engaging with the slots in said pivoted arms, the pivoted till or drawer cover having studs engaging with the slots of said segment arms and the sliding till or cash drawer having rack bars at the side with which said segments engage; substantially as specified.

40. In a cash register the combination with the indicating keys, the vertical and horizontal bails in rear thereof, the registering keys and the bail having vertical arms provided with blocks, of the transverse rod connected with said bail so as to move in unison therewith and means, substantially as described, for actuating said bail and rod and unlocking the keys.

41. In a cash register, the combination with the indicating keys, the vertical and horizontal bails in rear thereof, the registering keys, and the long bail having vertical arms provided with blocks, with which the registering keys engage, of the transverse rod connected and moving in unison with said long bail, the hooked plates and the cross bar to which they are secured, and means for actuating said long bail; substantially as and for the purpose specified.

42. In a cash register, the combination with the indicating keys, the short vertical and horizontal bails in rear thereof, the registering keys, the long bail provided with vertical arms and the blocks secured thereto, of the transverse rod connected and moving in unison with said long bail, the pivoted lever engaging with said bail and having a concavo-convex cam near its lower end, the forwardly extending pivoted arms the stud secured to one of said arms, and means for actuating said arms by the movement of the cash drawer; substantially as and for the purpose specified.

43. In a cash register of the character described, the combination with the registering mechanism comprising the series of shafts having dials at their front ends, the ratchet wheels and pawls for preventing backward movement thereof, the studs or pins on said ratchet wheels, the slidable sleeves mounted on said shafts, the notched wheels fixed to said shafts and the pinions on the rear ends of said shafts, of the transversely movable bars having rack teeth engaging with said pinions, the rearwardly extending arms secured to said bars, the transversely movable plate having shoulders with which said arms engage, the pivoted pawls engaging with said arms, the indicating keys and connections for actuating said pawls, and means for actuating said transversely movable plate; substantially as and for the purpose specified.

44. In a cash register of the character described, the combination with the registering mechanism comprising the rotatable shafts provided with dials and with ratchet wheels and pawls for preventing backward movement thereof, the studs or pins on said ratchet wheels, the slidable sleeves mounted on said shafts, the notched wheels fixed to said sleeves, means for throwing said notched wheels into engagement with the studs and the pinions on the rear ends of said shafts, of the transversely movable bars having rack teeth engaging with said pinions, the rearwardly extending arms secured to said bars, the transversely movable plate having shoulders with which said arms engage, the pivoted pawls engaging with said arms, indicating keys and connections for actuating said pawls, the wedge plate and rollers for actuating said transversely movable plate, the curved bar secured to said wedge plate, the cross bar to which said bar is pivoted and means for actuating said cross bar; substantially as and for the purpose specified.

45. In a cash register of the character described, the combination with the registering mechanism comprising the rotatable shafts provided with dials and with ratchet wheels and pawls for preventing backward movement thereof, the studs or pins on said ratchet wheels, the slidable sleeves mounted on said shafts, the notched wheels fixed on said sleeves, means for throwing said notched wheels into and out of engagement with said studs, and the pinions on the rear ends of said shafts, of the transversely movable bars having rack teeth engaging with said pinions, the rearwardly extending arms secured to said bars, the pivoted pawls engaging with said arms, the indicating keys and connections for actuating said pawls, the transversely movable plate having shoulders engaging with said arms, the wedge plate and rollers, the curved bar to which said wedge plate is secured, the cross bar to which said bar is pivoted, the forwardly extending pivoted arms to which said bar is secured, and means for actuating said pivoted arms by the movement of the cash drawer; substantially as and for the purpose specified.

46. In a cash register of the character described, the combination with the registering mechanism comprising the rotatable shafts provided with dials and with ratchet wheels and pawls for preventing backward movement thereof, the studs or pins on said ratchet wheels, the slidable sleeves mounted on said shafts, the notched wheels fixed on said sleeves, means for throwing said notched wheels into and out of engagement with said studs, and the pinions on the rear ends of said shafts, of the transversely movable bars having rack teeth engaging with said pinions, the rearwardly extending arms secured to said bars, the pivoted pawls engaging with said arms, the indicating keys and connections for actuating said pawls, the transversely movable plate having shoulders engaging with said arms, the wedge plate and rollers, the curved bar to which said wedge plate is secured, the cross bar to which said curved bar is pivoted, the forwardly extending pivoted and slotted arms to which said cross bar is secured, the pivoted segment having rollers engaging therewith and formed with rack teeth and a slotted arm, the pivoted till cover having studs engaging therewith and the sliding till or drawer cover having rack bars on the sides with which said segment engages; substantially as specified.

47. In a cash register of the character described, the combination with a registering mechanism comprising the rotatable shafts, provided with dials and with ratchet wheels and pawls for preventing backward movement thereof, the studs or pins on said ratchet wheels, the slidable sleeves mounted on said shafts, the notched wheels fixed on said sleeves, formed with annular grooves, and the pinions on the rear ends of said shafts, of the transversely movable bars having rack teeth engaging with said pinions and means for actuating said bars, the horizontally movable spring actuated plates, having flanges engaging with said grooves, the pins on the rear ends of said plates, the disks having beveled notches engaging with said pins, and the registering keys and connecting rods for actuating said disks; substantially as and for the purpose specified.

48. In a cash register of the character described, the combination with a registering mechanism comprising the rotatable shafts provided with dials and with ratchet wheels and pawls for preventing backward movement thereof, the studs or pins on said ratchet wheels, the slidable sleeves mounted on said shafts, the notched wheels fixed on said sleeves, formed with annular grooves, and the pinions on the rear ends of said shafts, of the transversely movable bars having rack teeth engaging with said pinions and means for actuating said bars, the horizontally movable spring actuated plates having flanges engaging with said grooves, the pins secured to the rear ends of said plates, the disks having beveled notches engaging with said pins, the registering keys and jointed rods connecting them with said disks, the transverse bail engaging with said keys, the cross bar and the hooked plates secured thereto adapted to engage with said bails; substantially as described.

49. In a cash register, the combination with the rotatable shafts provided with pins, ratchet wheels and dials, of the trip levers having bent arms with which the said ribs are adapted to engage, the upwardly extending arms having studs, and the pawls and means for actuating the same to throw them into engagement with said studs and ratchet wheels; substantially as and for the purpose specified.

50. In a cash register the combination with the rotatable shafts, provided with pins, ratchet wheels and dials, of the trip levers having laterally extending bent arms with which said ribs engage, upwardly extending arms provided with studs, and downwardly extending arms formed with beveled notches, the springs engaging therewith and the pawls and means for throwing them into engagement with said studs and ratchet wheels; substantially as and for the purpose specified.

51. In a cash register the combination with the rotatable shafts, provided with pins, ratchet wheels and dials, the trip levers having laterally extending bent arms with which said ribs engage and upwardly extending arms provided with studs, of the transversely reciprocating bar or plate provided with a series of slots, the levers having studs with which said slots engage and the series of spring actuated pawls pivoted to said levers, and adapted to engage with said trip levers and ratchet wheels; substantially as and for the purpose specified.

52. In a cash register the combination with the rotatable shafts, provided with pins, dials and ratchet wheels, the trip levers having laterally extending bent arms with which said ribs engage, and upwardly extending arms provided with studs, of the transversely reciprocating bar or plate, provided with a series of slots, the levers having studs engaging with said slots, the spring actuated pawls pivoted to said levers, the roller near one end of said bar or plate the vertically movable bar having a wedge shaped head which engages with said roller and means for elevating said bar by the movement of the cash drawer; substantially as and for the purpose specified.

53. In a cash register the combination with the rotatable shafts, provided with pins, dials and ratchet wheels, the trip levers having laterally extending bent arms with which said ribs engage, and upwardly extending arms provided with studs, of the transversely reciprocating bar or plate provided with a series of slots, the levers having studs engaging with said slots, the spring actuated pawls pivoted to said levers, the roller near one end of said bar or plate, the vertically movable bar having a wedge shaped head engaging with said roller, the spring actuated pivoted arm having a curved upper end, the beveled lug secured to the side of the apparatus against which said arm strikes in its upward movement, the forwardly extending pivoted arm to which said arm is pivoted and means for actuating said forwardly extending arm by the movement of the cash drawer; substantially as and for the purpose specified.

54. In a cash register the combination with the rotatable shafts provided with pins, dials and ratchet wheels, the trip levers having laterally extending bent arms with which said ribs engage, and upwardly extending arms provided with studs, of the transversely reciprocating bar or plate provided with a series of slots, the levers having studs engaging therewith, the spring actuated pawls pivoted to said levers, the roller near one end of said bar or plate, the vertically movable bar having a wedge shaped head engaging with said roller, the spring actuated pivoted arm having a curved upper end, the beveled lug secured to said apparatus against which said curved end strikes, the forwardly extending slotted arm pivoted to the side of the apparatus to which said arm is pivoted, the pivoted segment which engages with said slotted arm and provided with rack teeth and a slotted arm, the pivoted drawer cover having a stud engaging therewith and the sliding cash drawer having a rack bar engaging with the teeth of said segment; substantially as and for the purpose specified.

55. In a cash register the combination with a registering mechanism of the character described, of the transversely reciprocating plate having inclined slots therein, the bent levers having an aperture at one end, and provided with studs and pivoted pawls, of the stationary plate having apertures with which the pivot pins of said levers engage and annular grooves, and the coiled springs seated in said grooves and engaging with said plate and levers; substantially as and for the purpose specified.

56. In a cash register of the character described, the combination with the registering keys, the bail for locking them in position, and the cross bar provided with hooked plates, one of which is provided with a notch, of the hooked lever pivoted to the side of the apparatus adapted to engage with said notched plate, the sliding cash drawer having a bar at one side, the rear end of which is adapted to engage with and release said lever; substantially as and for the purpose specified.

In testimony that I claim the foregoing as my own I have hereunto affixed my signature in presence of two witnesses.

CHARLES LEONARD LILLEBERG.

Witnesses:
BENNETT S. JONES,
FRANCK L. OURAND.